(12) United States Patent
Aso

(10) Patent No.: US 12,658,792 B2
(45) Date of Patent: Jun. 16, 2026

(54) SEMICONDUCTOR APPARATUS HAVING HALF-WAVE RECTIFIER LLC CONVERTER

(71) Applicant: SANKEN ELECTRIC CO., LTD., Niiza (JP)

(72) Inventor: Shinji Aso, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 206 days.

(21) Appl. No.: 18/670,771

(22) Filed: May 22, 2024

(65) Prior Publication Data

US 2025/0038657 A1     Jan. 30, 2025

(30) Foreign Application Priority Data

Jul. 24, 2023     (JP) ................................. 2023-119964

(51) Int. Cl.
*H02M 3/00* (2006.01)
*H02M 1/00* (2006.01)
*H02M 3/335* (2006.01)

(52) U.S. Cl.
CPC ........... *H02M 3/01* (2021.05); *H02M 1/0009* (2021.05); *H02M 1/0058* (2021.05); *H02M 3/33571* (2021.05)

(58) Field of Classification Search
CPC ............................ H02M 3/01; H02M 3/33571
See application file for complete search history.

(56) References Cited

U.S. PATENT DOCUMENTS

| | | | |
|---|---|---|---|
| 10,069,427 B2 * | 9/2018 | Nishijima | ......... H02M 3/33553 |
| 10,892,687 B2 | 1/2021 | Fahlenkamp et al. | |
| 2015/0381055 A1 * | 12/2015 | Ohtake | ............... H02M 3/3376 |
| | | | 363/21.02 |
| 2021/0067046 A1 * | 3/2021 | Adragna | ................. H02M 1/08 |
| 2022/0109375 A1 * | 4/2022 | Iorio | ................ H02M 3/33592 |
| 2022/0158536 A1 * | 5/2022 | Jaksa | ................... H02M 1/0025 |

* cited by examiner

*Primary Examiner* — Gary A Nash
(74) *Attorney, Agent, or Firm* — METROLEX IP LAW GROUP, PLLC; Robert L. Scott, Esq.

(57) ABSTRACT

A first series circuit includes a main switch and a resonant switch. A second series circuit includes a primary winding and a resonant capacitor. A transformer includes the primary winding and a secondary winding. A controller controls the main switch and the resonant switch. A rectifier smoothing circuit rectifies and smoothes a voltage in the secondary winding. An output voltage detector detects an output voltage of the rectifier smoothing circuit. The controller controls the main switch based on a first drive signal. The controller turns on the resonant switch during a flyback period when an energy stored in the transformer is released from the secondary winding based on the second drive signal, which causes a resonant current to flow. The controller turns off the resonant switch during an excitation current charging period in which the energy stored in the transformer charges the resonant capacitor after the resonant current stops flowing.

9 Claims, 20 Drawing Sheets

(a) Io=3A,fsw=106kHz (b) Io=2A,fsw=131kHz    (c) Io=1.5A,fsw=150kHz (d) Io=1A,fsw=101kHz (e) Io=0.5A,fsw=54kHz (a) Io=3A,fsw=106kHz (b) Io=2A,fsw=108kHz (c) Io=1.5A,fsw=90kHz (d) Io=1A,fsw=66kHz

SEMICONDUCTOR APPARATUS HAVING HALF-WAVE RECTIFIER LLC CONVERTER

CROSS REFERENCE TO RELATED APPLICATIONS

This application claims priority to prior Japanese Patent Application No. 2023-119964 filed with the Japan Patent Office on Jul. 24, 2023, the entire contents of which are incorporated herein by reference.

BACKGROUND

The disclosure relates to semiconductor apparatus, and in particular to a semiconductor apparatus having half-wave rectifier LLC converter and control IC.

In a related art, a half-wave rectifier LLC converter has been proposed as a power circuit for isolated DC-DC converters. U.S. Pat. No. 10,892,687 (patent document 1) discloses a method of operating a power converter in which the main switch and resonant switch are controlled. The operating method disclosed in the patent document 1 proposes to control the resonant switch to control twice during the off period of the main switch. The first control of the resonant switch is turned on during the period after the main switch is turned off and current is flowing in the body diode of the resonant switch. Then, the resonant current due to the resonant capacitor and leakage inductance transmits power to the secondary side, and the second control of the resonant switch is performed just before the main switch. According to the patent document 1, a high-efficiency, low-noise power supply may be achieved by achieving ZVS (Zero Volt Switching) of the main switch.

However, in the control method disclosed in the patent document 1, the resonant switch is turned on when current flows through the body diode connected in parallel to the resonant switch immediately after the main switch is turned off, as in complementary control. Only the resonant current that flows when the resonant switch is turned on is sent as power to the secondary side. Therefore, if the output current is increased, the on-time of the main switch is increased, and the amplitude of the excitation current is increased, the operating frequency decreases. In this case, since the time to send power to the secondary side remains the same, the peak value of the current flowing through the secondary side increases more than proportionally to the increase in output current. Therefore, the effective value of the current flowing on the secondary side also increases more than proportionally to the increase in output current, increasing the loss of the resistive component of the secondary side circuit and lowering efficiency. For example, when the secondary-side diode is a synchronous rectifier consisting of a MOSFET, the problem is more pronounced.

A half-wave rectifier LLC converter and control IC according to one or more embodiments may prevent an increase in circulating current with an increase in output current.

SUMMARY

The half-wave rectifier LLC converter and control IC according to one or more embodiments comprises: a first series circuit in which a main switch and a resonant switch are connected in series at both terminals of a DC power supply; a second series circuit in which a primary winding and a resonant capacitor are connected in series at both terminals of the resonant switch; a transformer including a primary winding and a secondary winding electromagnetically coupled with the primary winding with opposite polarity, a controller that controls the main switch and the resonant switch, a rectifying and smoothing circuit that rectifies and smoothes the voltage of the secondary winding, and an output voltage detector that detects the output voltage of the rectifying and smoothing circuit. The controller may receive a first drive signal to control the main switch, a second drive signal to control the resonant switch during the period when the main switch is off, and a third drive signal to control the resonant switch after the second drive signal. The second drive signal has a flyback period during which energy stored in the transformer is released from the secondary winding after the main switch is controlled by the first drive signal, the resonant switch is turned on by the second drive signal during the flyback period, the resonant current flows, and after the resonant current stops flowing, the second drive signal is generated so that the resonant switch is turned off by the second drive signal during the excitation current charging period when the excitation current charges the resonant capacitor.

DETAILED DESCRIPTION

The half-wave LLC converter and control IC according to one or more embodiments is described in detail with reference to the drawings. The same or equivalent portions of the drivers for each embodiment in the figures may be marked with the same symbols and their descriptions may be omitted.

(Configuration of Half-Wave LLC Converter)

The half-wave rectifier LLC converter according to one or more embodiments may be one of the power circuit topologies for isolated DC-DC converters.

Figure 1:
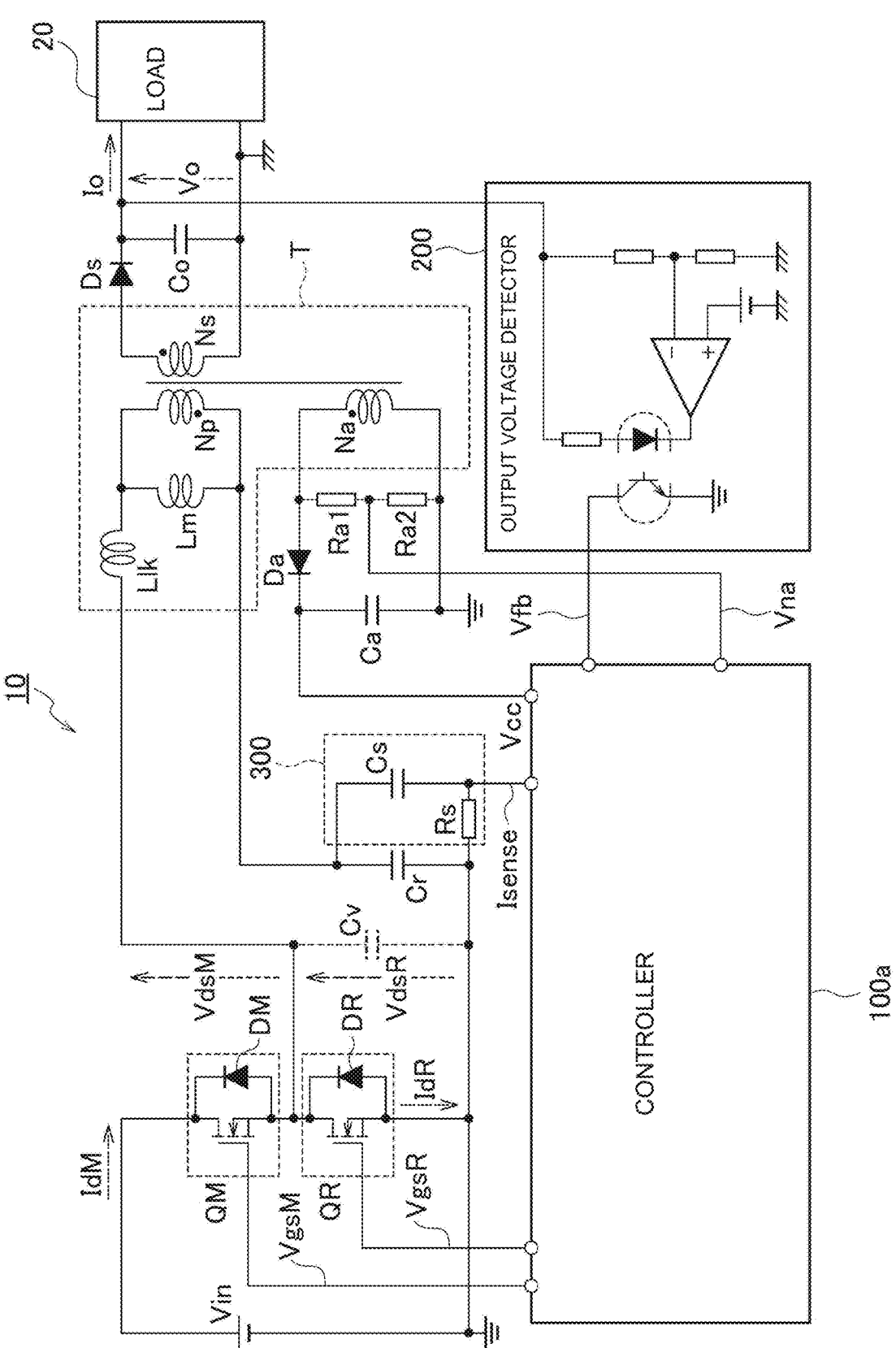
FIG. 1 is a diagram illustrating a configuration of a half-wave rectifier LLC converter operated by one or more embodiments of a control IC.

FIG. 1 shows the configuration of a half-wave LLC converter 10. The half-wave LLC converter 10 includes a first parallel circuit including a main switch QM and a body diode DM connected in parallel to the main switch QM at one terminal of the DC power supply Vin. The half-wave LLC converter 10 also includes a second parallel circuit including a resonant switch QR at the other terminal of the DC power supply Vin and a body diode DR connected in parallel to the resonant switch QR. The first and second parallel circuits are connected in series to form a half-bridge circuit.

The half-wave LLC converter 10 includes a transformer T including a primary winding Np and a secondary winding Ns. The half-wave LLC converter 10 connects a series resonant circuit in which a resonant reactor Lr (resonant reactor Llk in the figure), a resonant capacitor Cr and the primary winding Np are connected to both terminals of the resonant switch QR.

The half-wave LLC converter 10 also connects the diode Ds which is a rectifier and an output capacitor Co connected in series with the secondary winding Ns. The half-wave LLC converter 10 is an isolated DC-DC converter in which the polarity of the primary winding Np and the secondary winding Ns of the transformer T are connected such that the voltage generated in the secondary winding Ns when the main switch QM is turned on reverse-bias the diode Ds.

The resonant reactor Lr may use the leakage inductance Llk of transformer T. The body diodes DM and DR may not need to add if the semiconductor device conducting current in the opposite direction even when the main switch QM and resonant switch QR are in the off state.

As an example, when MOSFETs are used for the main switch QM and resonant switch QR, current may flow in the reverse direction through the body diodes generated by their structure. Gallium nitride field effect transistors (GaN-FETs) are also known to allow current to flow in the reverse direction due to the voltage between gate and drain even when the voltage between gate and source is below the threshold value. In some cases, it may not be necessary to add body diodes DM and DR by turning on the main switch QM and resonant switch QR during the period when current flows through the diodes.

First, the timing of the control of the resonant switch QR, which improves the increase in circulating current when the output current of the conventional control increases, is described.

Figure 2:
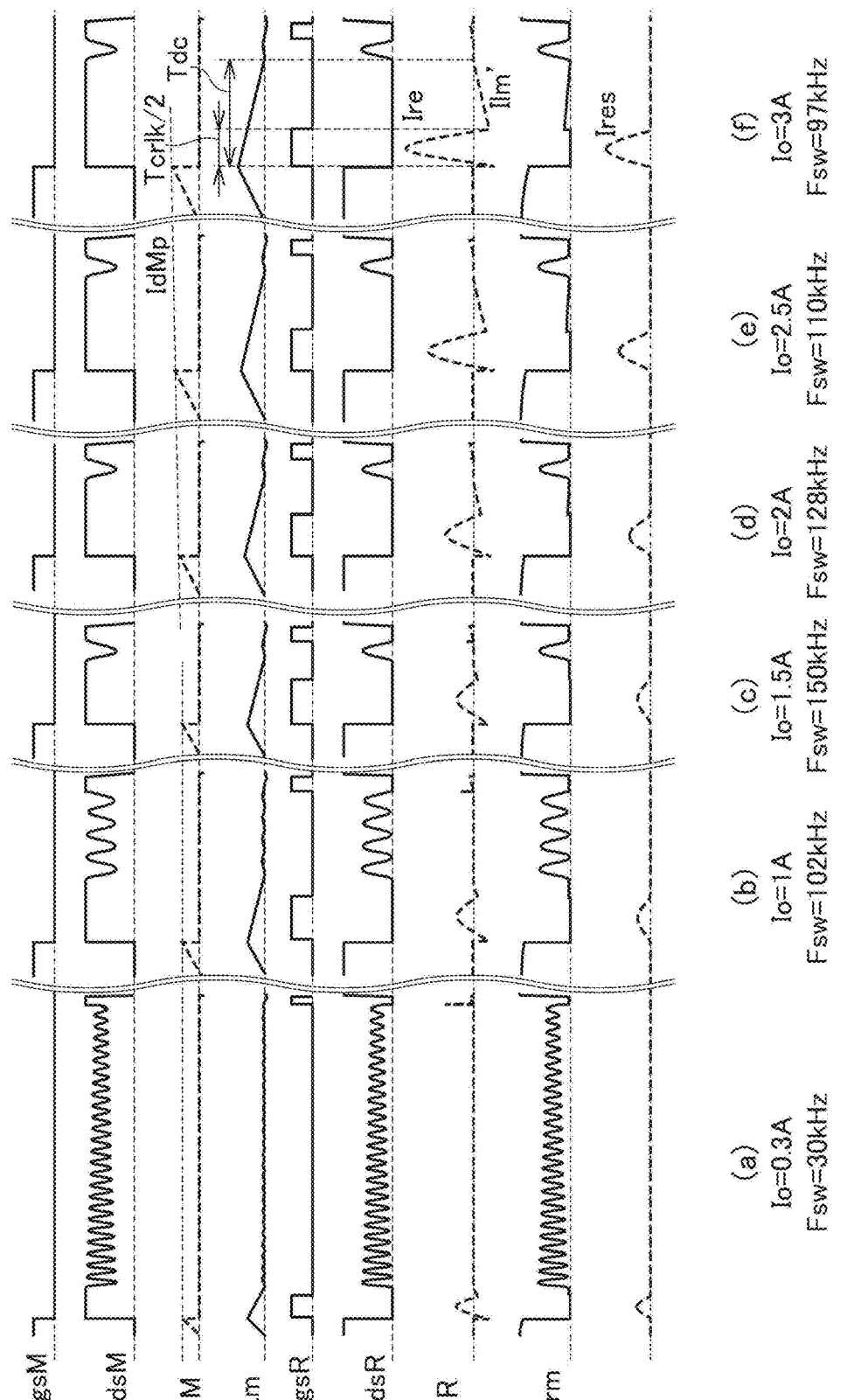
FIG. 2 is a diagram illustrating an operating waveform of a half-wave rectifier LLC converter as a comparative example.

FIG. 2 shows an example of an operating waveform in a half-wave rectifier LLC converter of related art, where the control was verified by simulation.

In the example shown in FIG. 2, the output voltage is assumed to be 20V and the rated output current is 3 A. In the example shown in FIG. 2, the higher half of the rated output current, 1.5 A to 3 A, is controlled by the on-time of main switch QM. The lower half of the rated output current, 1.5 A or less, is frequency controlled by fixing the on-time of the main switch QM. In the example shown in FIG. 2, it is assumed that the burst mode is activated when the output current is $\frac{1}{10}$ or less of the rated output current. Furthermore, the example shown in FIG. 2 is the operating waveform when the output current is changed from 0.3 A to 3 A when the upper limit of the operating frequency is 150 kHz and the circuit constants are set so that the operating frequency does not become an audio frequency when the output current is 0.3 A, $\frac{1}{10}$ of the rated output current.

As shown in FIG. 2, the operating waveform at 0.3 A has twice the time width of the other waveforms on the horizontal axis due to its low frequency. As can be seen from the operating waveforms shown in FIG. 2, zero-volt switching (hereinafter referred to as ZVS), in which the voltage at both terminal of the switch is set to zero volts when the switch turns on in the full load range, has been realized.

In the control method for the related technology, after the main switch is turned off as in general complementary control, the resonant switch is turned on when the current flows in the body diode connected in parallel to the resonant switch. The power transmission to the secondary side is then only the resonant current Ire flowing when this resonant switch QR is turned on. Note that general complementary control is the control in which the resonant switch QR is turned on to complement the off period of the main switch QM while having a dead time. As a result, during the period when the main switch QM is on, the primary winding Np of the transformer T is applied the difference of the voltage Vr of the resonant capacitor Cr from the DC power supply Vin, and the excitation current increases.

During the period when resonant switch QR is turned on by the complementary control, the primary winding Np of transformer T is applied the voltage Vr in the opposite direction, so the excitation current decreases.

Therefore, if the output current Io increases, the on-time of the main switch QM is increased, and the amplitude ILmp of the excitation current Ilm is increased, the operating frequency decreases. This decrease in operating frequency itself is not a problem, but the time to send power to the secondary side does not change Tcrlk/2 when the resonant cycle is Tcrlk. Therefore, the peak value of the current flowing through the secondary side increases more than proportionally to the increase in output current.

Therefore, the effective value of the current flowing in the secondary side also increases more than proportionally to the increase in output current, which increases the loss of the resistive component of the secondary side circuit and reduces efficiency. For example, this is a problem when the secondary-side diode is a synchronous rectifier consisting of a MOSFET.

It may also be seen that the current flowing through resonant switch QR also increases more than proportionally to the increase in output current.

This is because when the increase in output current is controlled by the increase in excitation current, the excitation current Ilm is not output to the secondary side after the resonant current Ire stops flowing. As a result, the circulating excitation current Ilmr flows from the source of resonant switch QR in the drain direction or through the body diode of resonant switch QR to charge the resonant capacitor Cr.

The increase in circulating excitation current Ilmr after this resonant current stops flowing may cause various problems. The circulating excitation current Ilmr is the circulating current circulating in the primary side, which increases the current flowing in the resonant switch QR and the second body diode, the primary winding Np of transformer T and the resonant capacitor Cr, increasing the loss of each element and deteriorating efficiency.

Therefore, if the timing for controlling the resonant switch QR after the main switch is turned off is performed at the timing of complementary control according to related art, the circulating current increases when the output current increases, resulting in a deterioration of efficiency. This implies that the slope of the decreasing excitation current becomes slower even when the output voltage decreases, and thus the circulating current increases, resulting in deteriorated efficiency when the output voltage is set lower in a power supply device with variable output voltage.

First Embodiment

Figure 3:
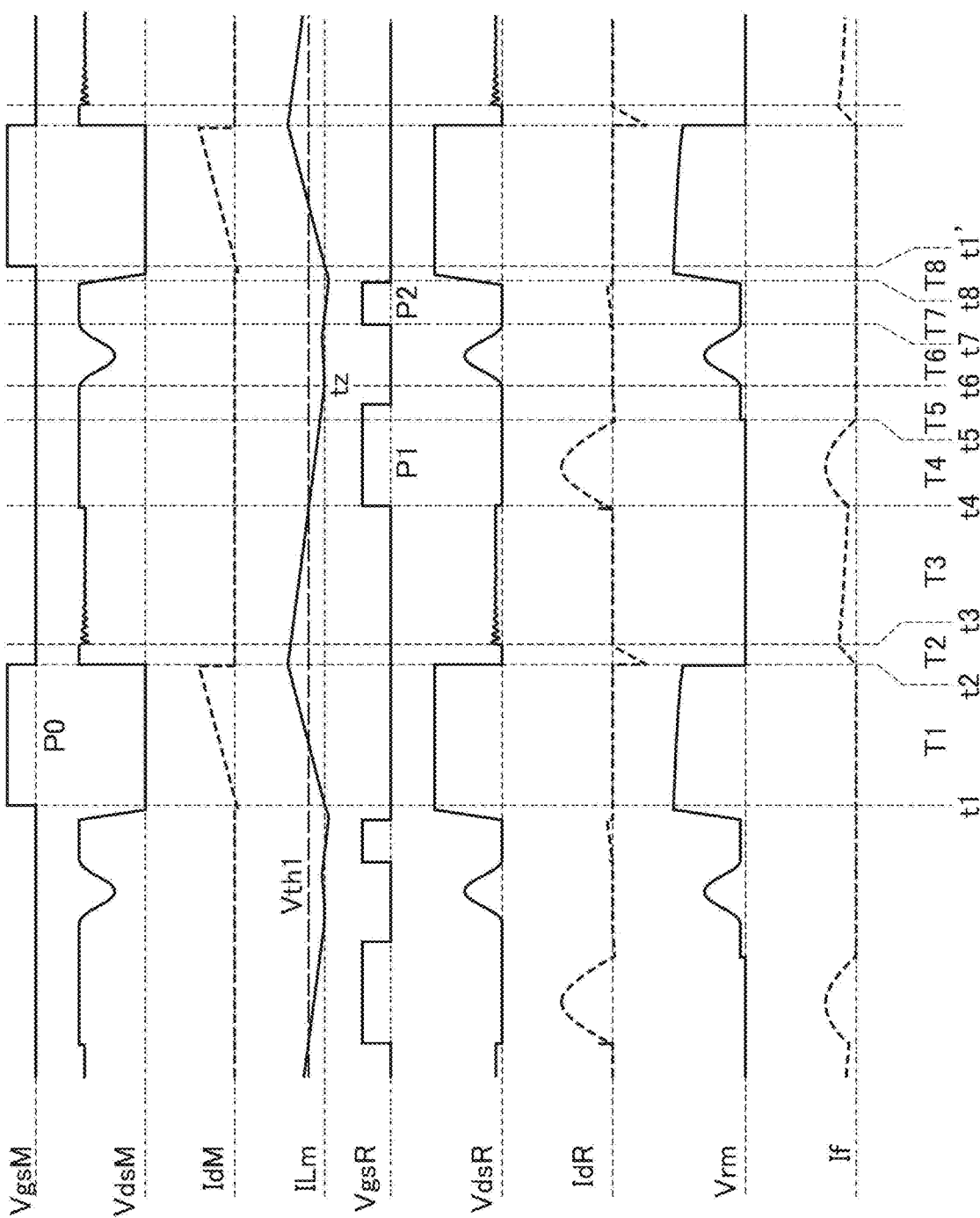
FIG. 3 is a diagram illustrating an operating waveforms of a first half-wave rectifier LLC converter and control IC according to a first embodiment.

FIG. 3 shows the operating waveforms when control according to one or more embodiments is applied. In FIG. 3, the drive signal VgsM is the drive signal of the main switch QM. The drive signal VgsM corresponds to the first drive signal. The voltage VdsM is the voltage of the main switch QM. The current IdM is the current of the main switch QM. The excitation current ILm is the current of the excitation inductance Lm of the transformer T. The threshold signal Vth1 is the threshold value that determines the start timing of the period T4 described below.

The drive signal VgsR is the drive signal of the resonant switch QR. The P1 signal is the first drive signal in drive signal VgsR, and the P2 signal is the second drive signal in drive signal VgsR. The first drive signal VgsR corresponds to the second drive signal, and the second drive signal VgsR corresponds to the third drive signal.

The voltage VdsR is the voltage of the resonant switch QR. The current IdR is the current of the resonant switch QR. The voltage Vrm is the voltage of the diode Ds. The current If is the current of the diode Ds.

In the example shown in FIG. 3, when the resonant switch QR is in the off state, the main switch QM is turned on, increasing the current in the excitation inductance Lm and leakage inductance Llk and including a period T1 to charge the resonant capacitor Cr.

In the example shown in FIG. 3, after the end of period T1, the resonant switch QR remains off and includes period T2 in which the main switch QM is turned off. During period T2, part of the current of the excitation inductance Lm and the current of the leakage inductance Llk are charged to the resonant capacitor Cr, and the remainder of the excitation inductance Lm is output to the secondary side.

In the example shown in FIG. 3, after the end of period T2, a period T3 is included in which the current of the excitation inductance Lm is output to the secondary side while the main switch QM and the resonant switch QR remain off. This period is the same as the operation of a normal flyback converter, and period T3 corresponds to the flyback period.

In the example shown in FIG. 3, in the middle of period T3, the main switch QM remains off and includes period T4 in which the resonant switch QR is turned on. This period T4 is the period when the voltage of the resonant capacitor Cr is applied to the primary winding Np, the resonant current of the resonant capacitor Cr and the leakage inductance Llk flows, and the half period of the resonant current stops flowing.

In the example shown in FIG. 3, after the end of period T4, the excitation current is charged to the resonant capacitor Cr, and the resonant switch QR is turned off while the main switch QM remains off when charging the resonant capacitor Cr. A period T5 is included in which the excitation current ends at zero. Period T5 corresponds to the excitation current charging period.

In the example shown in FIG. 3, after the end of period T5, a period T6 is included in which resonance operation is performed between the capacitance component of the resonant capacitor Cv, which is equivalently connected between the output of the half bridge and GND, and the inductance component (Lm+Llk) that the primary winding Np has.

In the example shown in FIG. 3, in the middle of period T6, a period T7 is included in which the main switch QM remains off and the resonant switch QR is turned on, increasing the excitation current in the opposite direction to that of period T1.

Furthermore, in the example shown in FIG. 3, after the end of period T7, a period T8 is included in which the main switch QM remains off and the resonant switch QR is turned off to reduce the voltage at the main switch QM.

The control method of the half-wave LLC converter 10 in the first embodiment controls the timing of period T4 so that the time of period T5 is less than the resonant cycle Tcrlk.

The control method shown in FIG. 3 includes a new period T3, the flyback period, compared to the control method for the comparative example shown in FIG. 2. Therefore, as the load current increases, period T5 becomes longer in the comparative example, but period T3, the flyback period, becomes longer in the control method shown in FIG. 3.

The example is explained with reference to FIG. 4 that the circulating current increases with an increase in load current in the control for the related technologies described above, whereas the circulating current does not increase in the control for one or more embodiments.

Figure 4:
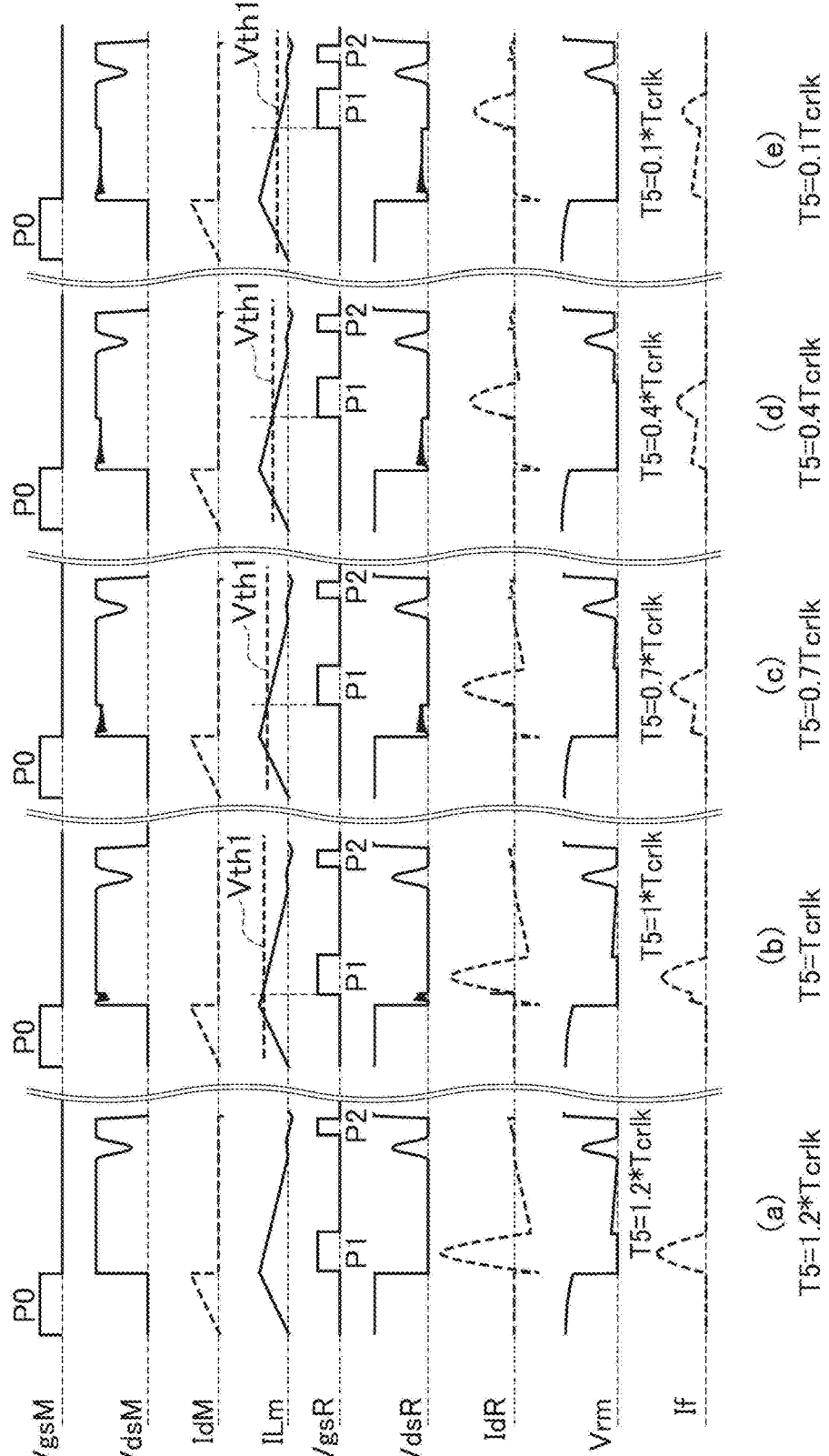
FIG. 4 is a diagram illustrating an operating waveforms of a half-wave rectifier LLC converter and control IC of a first embodiment when a turn-on timing of a resonant switch is moved backward according to a first embodiment.

The state (a) shown in FIG. 4 has the same timing as the state (f) shown in FIG. 2. The state (b) to the state (f) shown in FIG. 4 are the same circuit constants as the state (a) shown in FIG. 4, and the operating waveforms from the simulation when the timing at which resonant switch QR is turned on by the P1 signal is changed between time t2 and t6, when the excitation current decreases after main switch QM is turned off by the P0 signal (see FIG. 6).

The state (a) shown in FIG. 4 is when the system operates with conventional control and the period T5 is 1.2×Tcrlk. The state (b) shown in FIG. 4 is the operating waveform when the timing of the P1 signal is delayed backward and the period of T5 is Tcrlk.

The state (c) shown in FIG. 4 is the operating waveform when the timing of the P1 signal is delayed further backward and the duration of period T5 is set to 0.7×Tcrlk. The state (d) shown in FIG. 4 is the operating waveform when the timing of the P1 signal is delayed further backward and the duration of period T5 is set to 0.4×Tcrlk. Furthermore, the state (e) shown in FIG. 4 is the operating waveform when the timing of the P1 signal is delayed further backward and the duration of period T5 is set to 0.1×Tcrlk.

In the example shown in FIG. 4, the waveform of the current IdM of the main switch QM does not change, but the current IdR of the resonant switch QR and the current If of the diode Ds on the secondary side change significantly.

From the simulation data, the average and effective currents of the resonant switch QR, IdR, are as follows.

In the state (a) shown in FIG. 4, the average current is 210 mAave and the effective current is 1192 Arms. In the state (b) shown in FIG. 4, the average current is 209 mAave and the effective current is 1061 Arms. In the state (c) shown in FIG. 4, the average current is 207 mAave and the effective current is 846Arms. In the state (d) shown in FIG. 4, the average current is 206 mAave and the effective current is 712 mA rms. In the state (e) shown in FIG. 4, the average current is 205 mAave and the effective current is 657 mArms.

The average and effective currents of the diode Ds current If are as follows.

In the state (a) shown in FIG. 4, the average current is 3.0 Aave and the effective current is 8.00 Arms. In the state (b) shown in FIG. 4, the average current is 3.0 Aave and the effective current is 7.33 A rms. In the state (c) shown in FIG. 4, the average current is 3.0 Aave and the effective current is 6.12 Arm s. In the state (d) shown in FIG. 4, the average current is 3.0 Aave and the effective current is 5.35 Arms. Furthermore, in the state (e) shown in FIG. 4, the average current is 3.0 Aave and the effective current is 4.80 Arms.

Since the average current of resonant switch QR, IdR, is equal to the average current of main switch QM, it may be seen in FIG. 4 that the input current decreases as one goes from the state (a) to the state (e). This may mean that the effective currents flowing in resonant switch QR and transformer T are reduced, and the loss due to the on-resistance of resonant switch QR and the resistive component of transformer T is reduced, resulting in improved efficiency.

This also indicates that the more the P1 signal is delayed backward, the less the energy of the excitation inductance Lm stored in period T1 may be output to the secondary side, and the less the period T5, which charges the resonant capacitor Cr and increases the circulating current. In other words, the new period T3, during which the energy of the excitation inductance Lm stored in period T1 may be output to the secondary side, appears as an effect.

The more the P1 signal is delayed backward, the wider the period T3 becomes so that the stored excitation energy may be output directly to the secondary side, and the narrower the period T5 becomes so that the circulating current is reduced.

Therefore, the pulse width of the P1 signal is Tcrlk/2, and the P1 off timing is set at the time when the excitation current is zero for the lowest loss.

Therefore, the ON width of the P1 signal should be Tcrlk/2, and the turn-on timing should be before Tcrlk/2, the timing when the excitation current becomes zero. However, when commercializing the product, a margin is required. Therefore, referring to the waveform shown in FIG. 4, the period T5 should be less than the resonant cycle Tcrlk so that the period T3 is provided, for example, as shown in the state (b) shown in FIG. 4, including period T3.

Figure 5:
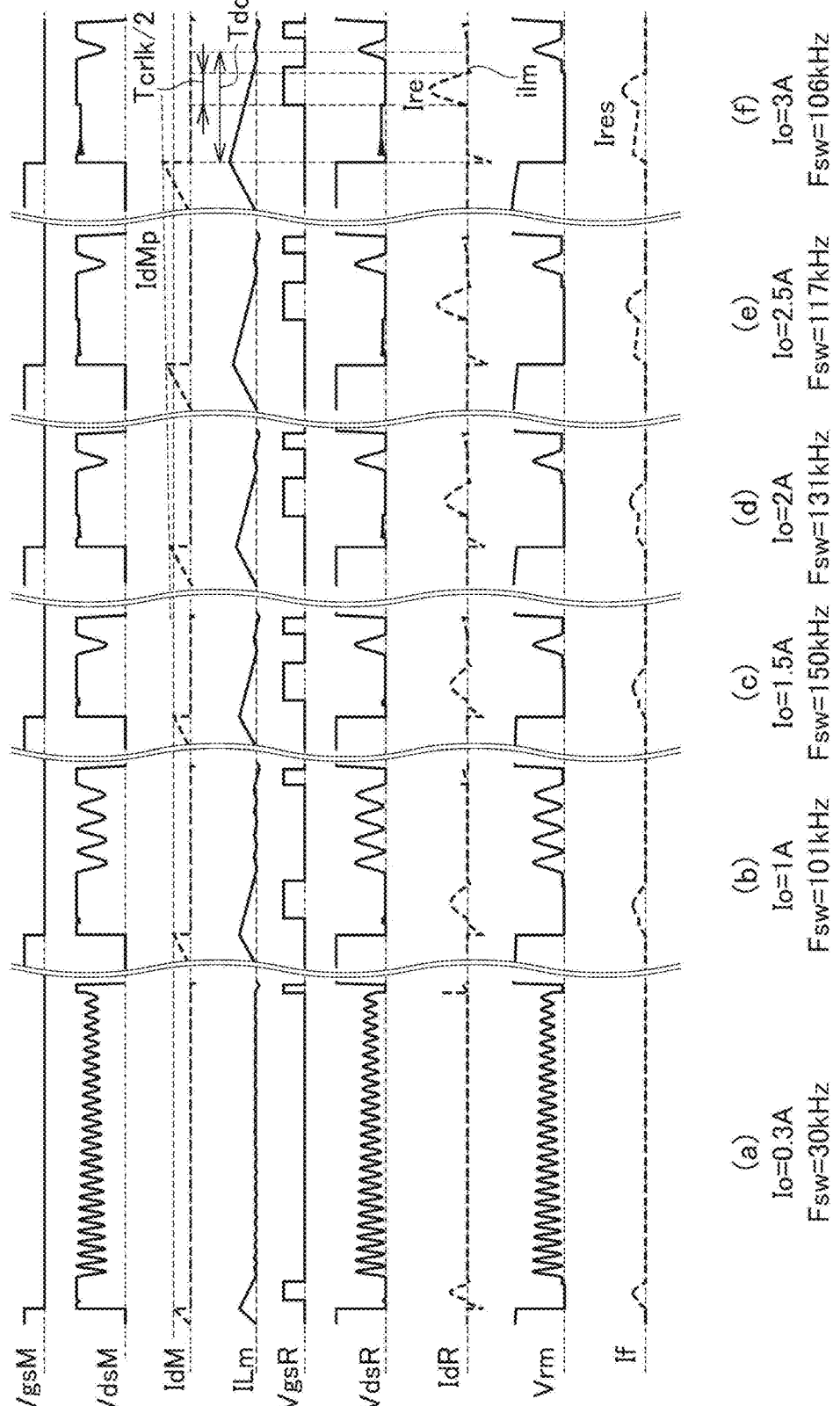
FIG. 5 is a diagram illustrating an operating waveforms of a first half-wave rectifier LLC converter and control IC according to a first embodiment.

FIG. 5 shows the operating waveforms simulated on a model basis when the control method for one or more embodiments is applied. The example shown in FIG. 5 shows that the peak values of the current IdR of the resonant switch QR and the current If of the diode Ds, the rectifier on the secondary side, are lower and the effective current is lower compared to the example shown in FIG. 2.

(Configuration of Half-Wave LLC Converter 10)

The half-wave LLC converter 10 of one or more embodiments relates to a method of controlling the main switch QM and the resonant switch QR and a control IC for controlling the main switch QM and the resonant switch QR. The control IC may correspond to the controller 100*a* in the first embodiment. The details of the circuit of the half-wave LLC converter 10 are as shown in the description of FIG. 1 above.

The control according to one or more embodiments may aim to make period T5 as short as possible and period T3 as long as possible. The turn-off timing of the resonant switch QR may be in period T5 when ZVS may be done, and period T5 may be less than Tcrlk with a margin to account for variations in the turn-on timing and on-width. In addition, period T4 is ½ of the resonance cycle. Therefore, assuming the time tz when the excitation current becomes zero, the on-time of the P1 signal is set from tz−1.5×Tcrlk to tz−Tcrlk/2, and the on-width is set to Tcrlk/2 or more, and the off-time is set before tz.

The turn-on timing of the threshold signal Vth1 value and P1 signal should be set to detect the excitation current, turn on at the time t4 when it matches the predetermined threshold signal Vth1 value, and turn off at the period T5 after Tcrlk/2 has elapsed.

(Configuration of Half-Wave LLC Converter 10 and Control IC)

Figure 6:
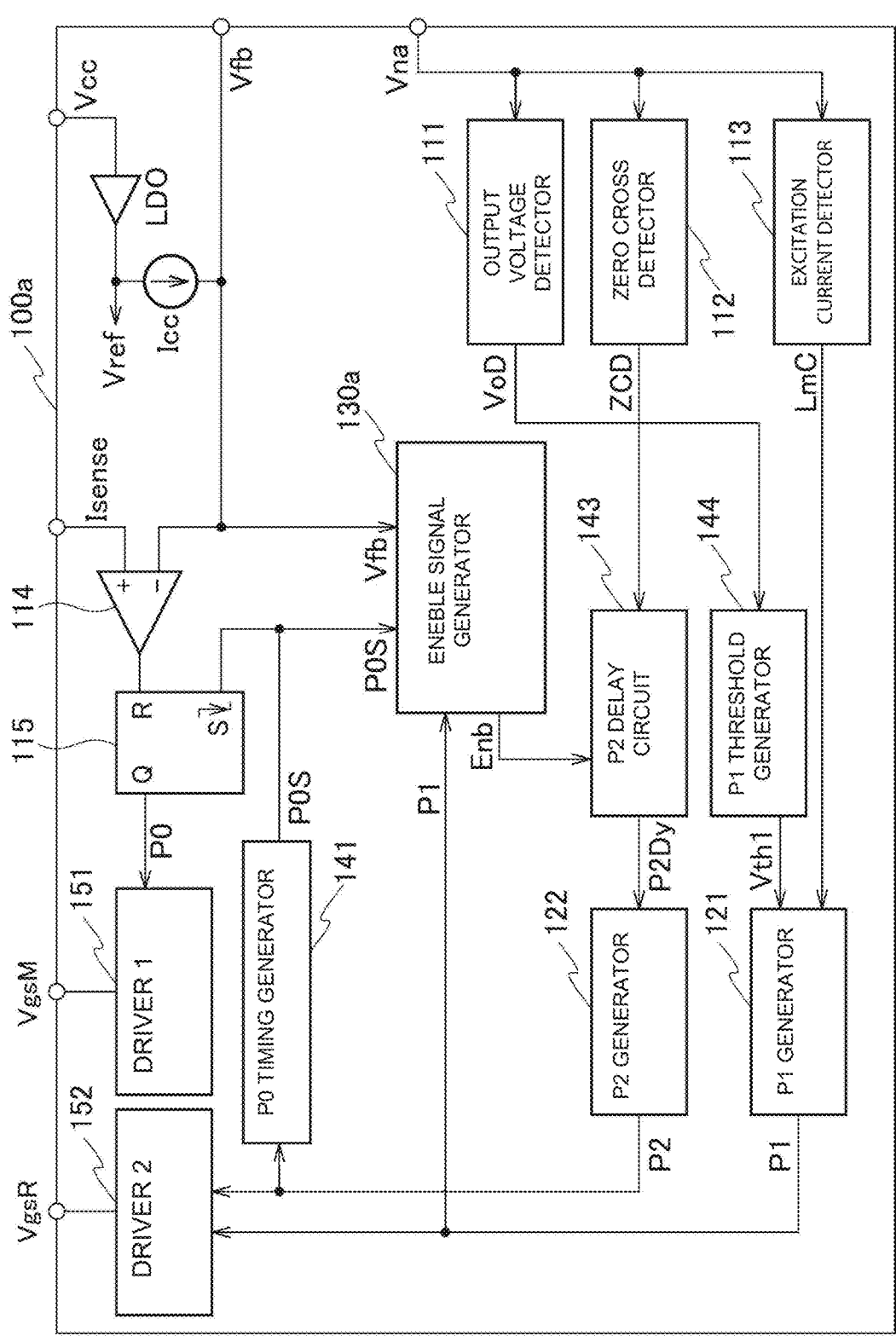
FIG. 6 is a block diagram illustrating a controller according to a first embodiment.

FIG. 1 and FIG. 6 are used to describe the half-wave LLC converter 10 and control IC of the first embodiment.

As shown in FIG. 1, the half-wave LLC converter 10 includes a first series circuit in which the main switch QM and resonant switch QR are connected in series at both terminals of the DC power supply Vin, and a second series circuit in which the primary winding Np and resonant capacitor Cr are connected in series at both terminals of resonant switch QR.

The main switch QM and resonant switch QR contain a MOSFET (Metal Oxide Semiconductor Field Effect Transistor) and include body diodes DM and DR between drain and source, respectively.

The MOSFET also has an output capacitance Coss between drain and source. The capacitance of this output capacitance Coss appears in the resonant operation. To simplify the explanation of the operation, it is connected as a resonant capacitor Cv at both terminals of the resonant switch QR shown in FIG. 1, but no capacitor is needed in addition to the MOSFET's output capacitance Coss.

The main switch QM and resonant switch QR may be compound semiconductor switch elements such as GaN (gallium nitride) or SiC (silicon carbide). The main switch QM and resonant switch QR may also include IGBTs (Insulated Gate Bipolar Transistors). If the device structure does not have a body diode, it may be replaced by adding body diodes DM and DR separately. MOSFETs may be used as the main switch QM and resonant switch QR.

In addition, the half-wave LLC converter 10 includes a transformer T that includes a primary winding Np and a secondary winding Ns that are electromagnetically coupled with opposite polarity. The transformer T may be configured with a coupling coefficient between the primary winding Np and the secondary winding Ns less than 1 such that the primary winding Np has an excitation inductance Lm and the primary winding Np includes a leakage inductance Llk. At both terminals of the secondary winding Ns of the transformer T, a first rectifier circuit is connected to rectify and smooth the voltage on the secondary side by connecting in series a diode Ds, which is a rectifier, and an output capacitor Co. The first rectifier circuit may correspond to a rectifying and smoothing circuit.

Furthermore, the transformer T has an auxiliary winding Na, and a second rectifier circuit in which a rectifier Da and an output capacitor Ca are connected in series at both terminals of the auxiliary winding Na.

Furthermore, the half-wave LLC converter 10 includes an output voltage detector 200 that detects the output voltage Vo, a winding voltage detector that detects the winding voltage, and an IdM detector that detects the current IdM of the main switch QM.

Here, in the current detector (IdM detector) of the main switch QM, as shown in FIG. 1, a series circuit of capacitor Cs and resistor Rs are connected to both terminals of resonant capacitor Cr, and the capacitance of the capacitor Cs is set to ¹⁄₁₀ or less of the capacitance of the resonant capacitor Cr. Although the method of connecting a detection resistor in series with the resonant capacitor as in conventional technology is also acceptable, the configuration as shown in FIG. 1 reduces the power consumed by the resistor Rs to ¹⁄₁₀ or less. The current detector (IdM detector) may also detect the current of the resonant switch QR.

The controller 100a controls the main switch QM based on the output signals of the output voltage detector 200 and the IdM detector. The controller 100a also controls the resonant switch QR twice during the off period of the main switch QM by the first pulse signal, P1, and the second pulse signal, P2. The controlling a switch may include at least one of turning on a switch and turning off a switch. The order in which a switch is turned on or off may be whichever operates first. A switch may be turned on first, and then turned off. A switch may be turned off first, and then turned on.

The controller 100a includes a current source Icc, as shown in FIG. 6. The controller 100a also generates a Vfb signal indicating the feedback voltage by the output signal of the output voltage detector 200. Furthermore, the controller 100a includes a comparator 114 that compares the Isense signal and the Vfb signal.

The comparator 114 is connected so that when the value of the Isense signal exceeds the value of the Vfb signal, the comparator 114 outputs High signal to the R terminal of the SR-FF115 (SR flip-flop). The POS signal is input to the S terminal of SR-FF115, and output the P0 signal in which the output of SR-FF115 is set to High at the falling edge of the POS signal, and the output of SR-FF115 is set to Low at the output of comparator 114.

The controller 100a also includes a first driver 151 that receives the P0 signal and generates a signal to drive the main switch QM of the half-wave LLC converter 10. The first driver 151 controls the output voltage to a constant voltage by controlling the on-width of the drive signal VgsM to the main switch QM. The drive signal VgsM corresponds to the first drive signal.

Furthermore, the controller 100a includes an output voltage detector 111 that receives the auxiliary winding voltage Vna, generates a VoD signal indicating a voltage proportional to the output voltage, and outputs it to the P1 threshold generator 144. The VoD signal corresponds to the second voltage signal.

The controller 100a also includes a zero cross detector 112 that receives the auxiliary winding voltage Vna and outputs a ZCD signal, a pulse signal that detects the zero voltage at which the voltage of the auxiliary winding Na changes from negative to positive voltage, to the P2 delay circuit 143. The ZCD signal corresponds to the zero cross signal. The P2 delay circuit 143 corresponds to the second pulse delay circuit.

Furthermore, the controller 100a includes an excitation current detector 113 that receives the auxiliary winding voltage Vna, generates an LmC signal indicating a voltage proportional to the excitation current, and outputs it to the P1 generator 121. The LmC signal corresponds to the first voltage signal.

The P1 threshold generator 144 generates a threshold signal Vth1 multiplied by a preset ratio based on the VoD signal, which is the output of the output voltage detector 111, so that the threshold value becomes the value indicated by the threshold signal Vth1 described below, and outputs it to the P1 generator 121. In other words, as the value of the VoD signal increases or decreases, the value of the threshold signal Vth1 also increases or decreases proportionally. The P1 threshold generator 144 corresponds to the first pulse threshold generator.

The P1 generator 121 turns the P1 signal High based on the LmC signal of the excitation current detector 113 and the threshold signal Vth1 of the P1 threshold generator 144 and sends out a signal with a preset pulse width. The P1 generator 121 corresponds to the first pulse generator.

The preset ratio in the P1 threshold generator 144 and the preset pulse width in the P1 generator 121 are determined as follows. The time at which the excitation current becomes zero is designated as time tz.

The timing when the P1 signal generated by the P1 generator circuit 121 is set to High is from 0.5×Tcrlk to 1.5×Tcrlk before time tz. In the embodiment, Tcrlk indicates the resonant cycle. The P1 signal corresponds to the first pulse signal.

The timing at which the P1 signal is set to Low shall be before time tz. Furthermore, the pulse width of the P1 signal shall be 0.5×Tcrlk or more. The threshold signal Vth1 of the P1 threshold generator 144 and the pulse width of the P1 generator 121 are defined so that a P1 signal with such a pulse width is generated.

With the above settings, even if the output voltage changes, the timing at which the P1 signal set to High is before 0.5×Tcrlk to 1.5×Tcrlk, and the timing at which the P1 signal is set to Low is before the time tz when the excitation current becomes zero. If the output voltage does not change, the threshold signal Vth1 may be a predetermined threshold voltage so that the timing is as explained above. The predetermined threshold voltage corresponds to the third voltage signal.

The controller 100a also includes an enable signal generator 130a that receives the P1 signal, POS signal, and Vfb signal and outputs an Enb signal, a pulse signal based on the voltage of the Vfb signal, outputs to the P2 delay circuit 143.

The controller 100a also includes a P2 delay circuit 143, which receives an Enb signal and a ZCD signal, triggers the ZCD signal when the Enb signal is High, and outputs a P2Dy signal to the P2 generator 122 to turn on the resonant switch QR after a pre-determined delay time.

The controller 100a also includes a P2 generator 122 that receives the P2Dy signal and outputs a P2 signal with a preset pulse width to the second driver 152. The P2 generator 122 corresponds to the second pulse generator. The P2 signal corresponds to the second pulse signal.

Furthermore, the controller 100a includes a P0 timing generator 141 that outputs a POS signal, a preset pulse signal, from the edge of the P2 signal. In addition, the controller 100a includes a second driver 152 that receives the P1 and P2 signals and outputs a drive signal VgsR that drives the resonant switch QR of the half-wave LLC converter 10.

Figure 7:
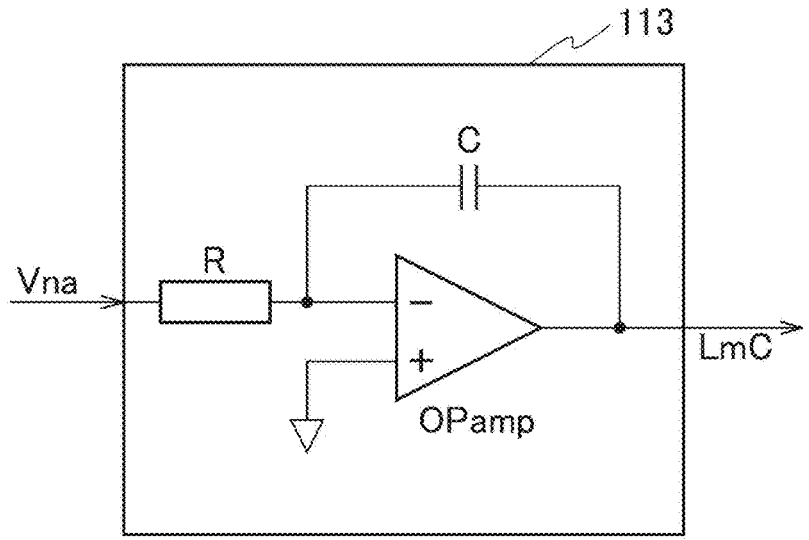
FIG. 7 is a diagram illustrating a configuration of an excitation current detector according to a first embodiment.

FIG. 7 shows the excitation current detector 113 configured with an operational amplifier. If configured with an integrating circuit as shown in FIG. 7, the auxiliary winding voltage Vna is integrated, and the excitation current detector 113 outputs an LmC signal indicating a voltage proportional to the excitation current.

Figure 8:
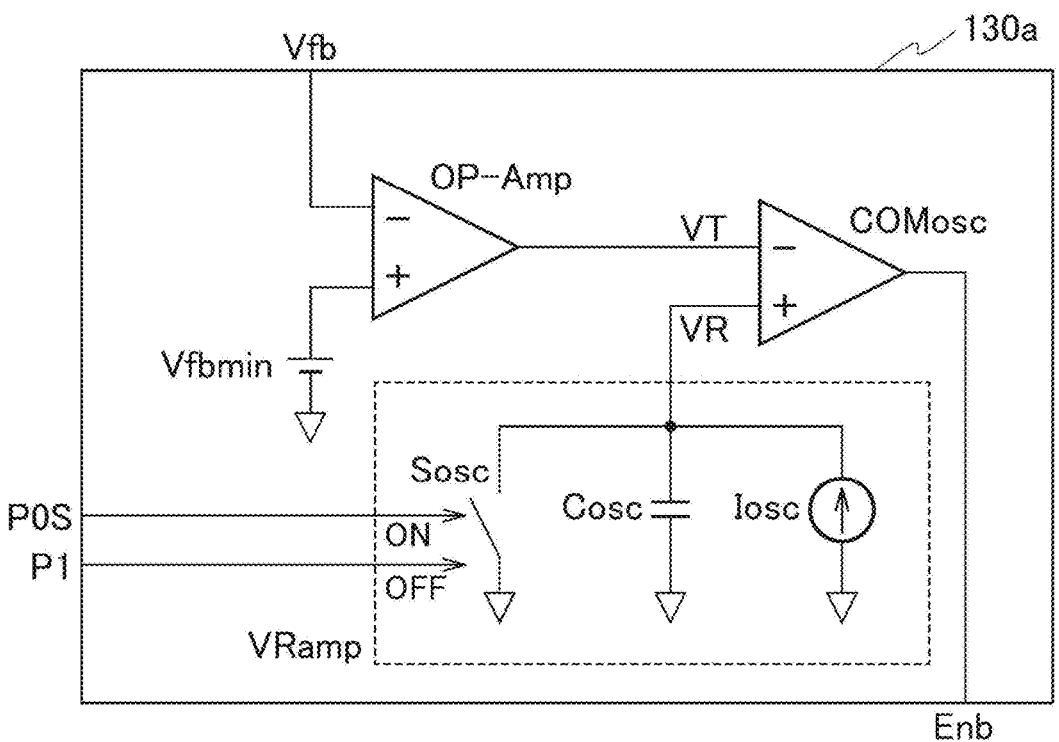
FIG. 8 is a diagram illustrating a configuration of an enable signal generator according to a first embodiment.

FIG. 8 shows the configuration of the enable signal generator 130a of the controller 100a of the first embodiment. The enable signal generator 130a is composed of a reference voltage Vfbmin, an amplifier OP-Amp that outputs the voltage VT, which is amplified by the voltage difference between the Vfb signal indicating the feedback voltage and the reference voltage Vfbmin. The enable signal generator 130a also includes a VRamp circuit. The VRamp circuit is connected in parallel with a reference current Iosc, a capacitor Cosc that charges the reference current Iosc, and a switch Sosc that resets the capacitor Cosc. The VRamp circuit is turned on by the POS signal and turned off by the edge of the P1 signal, and the reference current Iosc charges Cosc to generate the ramp voltage VR.

The enable signal generator 130a has a comparator COMosc with the voltage VT connected to the − terminal (negative terminal) and the lamp voltage VR connected to the + terminal (positive terminal), and sends out the Enb signal, a pulse signal that is set to High when the lamp voltage VR exceeds the voltage VT.

FIGS. 9A to 9D show the operating waveforms of the half-wave LLC converter 10 applying the control by the controller 100a of the half-wave LLC converter 10 of the first embodiment.

The state (a) to (e) illustrated in FIGS. 9A to 9D show the operating waveforms when the output current decreases as one goes from the state (a) to (e). The voltage of the Vfb signal decreases as the output current decreases from the configuration of output voltage detector 200 and controller 100a.

Figure 9A:
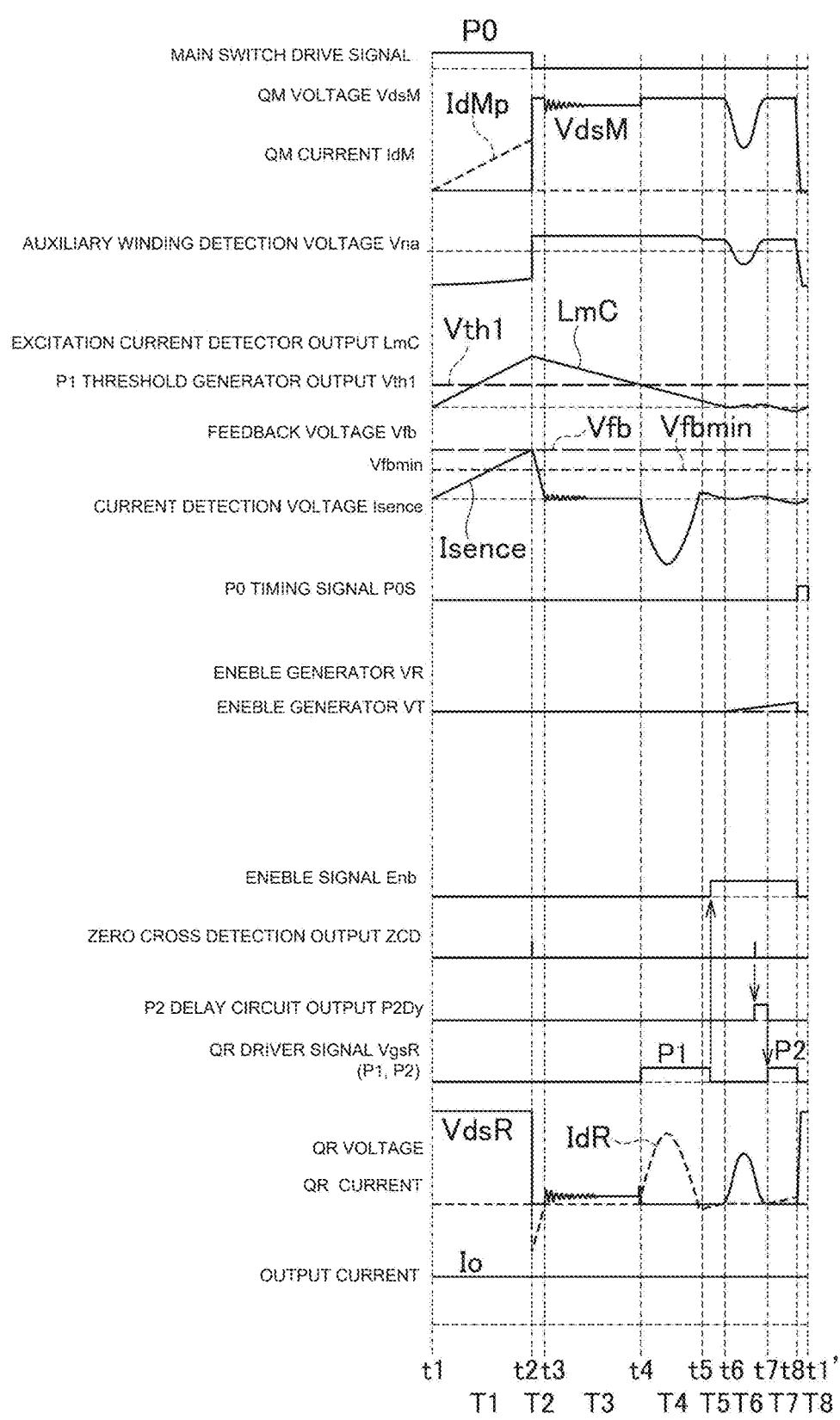
FIG. 9A is a diagram illustrating an operating waveforms of a half-wave rectifier LLC converter of a first embodiment.

(a) shown in FIG. 9A shows the waveform when the output current is high and the Vfb signal is higher than the reference voltage Vfbmin.

In period T1, the POS signal is set to High at time t1, SR-FF115 is set, and the P0 signal is set to High. In addition, the drive signal VgsM is set to High and the main switch QM turns on, the current of the main switch QM increases and the voltage of the Isense signal increases.

When the voltage of the Isense signal reaches the voltage of the Vfb signal at time t2, the comparator output is set to High, SR-FF115 is reset and the P0 signal is set to Low. In addition, the drive signal VgsM is set to Low and the main switch QM turns off.

In period T1, if the voltage of the resonant capacitor Cr is Vcr, the difference between the voltage of the DC power supply Vin and Vcr is applied to the leakage inductance Llk and the excitation inductance Lm. Therefore, Itran, the current in the primary winding Np of transformer T, is shown below in EQ.(1) and increases with time. Both the excitation inductance Lm and the leakage inductance Llk accumulate a current of Itran. The auxiliary winding voltage Vna is negative in proportion to the voltage difference between Vin and Vcr.

$$Itran = \{(Vin - Vcr)/(Lm + Llk)\} \times t \qquad \text{EQ. (1)}$$

At time t2, when the main switch QM turns off, the auxiliary winding voltage Vna zero-crosses from negative to positive, but the Enb signal is set to Low, so the output of the P2 delay circuit 143 remains zero.

In period T2, when the resonant switch QR turns off at time t2, the energy stored in the excitation inductance Lm and leakage inductance Llk generates a reverse voltage.

Since the leakage inductance Llk is not coupled to the secondary winding Ns, it is not output from the secondary winding Ns to the first rectifier circuit and is charged to the resonant capacitor Cr along with part of the energy of the excitation inductance Lm. On the other hand, the excitation inductance Lm is an inductance coupled with the secondary winding Ns. Therefore, its reverse voltage is generated in the direction of conducting the diode Ds connected to the secondary winding Ns of the transformer T, and the remainder of the energy of the excitation inductance Lm charged to the resonant capacitor Cr is output to the secondary side.

Then, when all the leakage energy is charged to the resonant capacitor Cr at time t3, all the energy of the excitation inductance Lm is output to the secondary side.

In the conventional control, the resonant switch QR is turned on in period T2, but in the embodiment, the resonant switch QR is basically not turned on in period T2, which is different from the conventional control.

However, as the load current decreases and the voltage of the Vfb signal decreases, period T1 becomes shorter, and as a result, resonant switch QR may turn on in period T2 when the maximum value of the LmC signal approaches the threshold signal Vth1 value. However, even in such operation, it is included in the scope of one or more embodiments.

In period T3, both the main switch QM and the resonant switch QR are off. The energy stored in the leakage inductance Llk is zero at time T3, and the energy stored in the excitation inductance Lm is output from the secondary winding Ns to the first rectifier circuit. This period is the same as the operation of a normal flyback converter, and period T3 corresponds to the flyback period.

During periods T2 and T3, the energy stored in the excitation inductance Lm is output from the secondary winding Ns to the first rectifier circuit, so the auxiliary winding voltage Vna is proportional to the output voltage, and the output of the excitation current detector 113 decreases in proportion to the excitation current.

In the period T4, at time t4, the P1 generator circuit 121 turns on the resonant switch QR when the value of the LmC signal decreases and the value of the LmC signal equals the threshold signal Vth1.

Since the energy of the excitation inductance Lm is output to the secondary side, when the resonant switch QR is turned on, a resonant current flows between the resonant capacitor Cr and the leakage inductance Llk.

Therefore, the P1 generator 121 includes an on-width of ½ or more of the resonant cycle Tcrlk of the resonant capacitor Cr and the leakage inductance Llk. The P1 threshold generator 144 sets the value of the threshold signal Vth1 and the P1 generator 121 sets the pulse width of the P1 signal so that the P1 signal is turned off between (tz−Tcrlk) and time tz, with time t6 as tz when the excitation current becomes zero.

The period T5 is ½ Tcrlk time after resonant switch QR is turned on, the resonant current is limited by the excitation current, and the excitation current charges the resonant capacitor Cr through the resonant switch QR. In the period T5, the current flows from the source to the drain direction of the resonant switch QR. The period T5 corresponds to the excitation current charging period.

Since the P1 signal is generated under the conditions explained above, the P1 signal is turned off in the period T5. Even though the resonant switch QR is turned off during the period, the current path does not change because the current is diverted to the body diode DR after turned off.

The period T5 ends when the excitation current reaches zero at the time t6. In the period T6, the excitation current becomes zero at the time t6, but because the resonant switch QR is turned off, the excitation current does not flow in the negative direction as in general complementary control. Therefore, resonance occurs between the excitation inductance Lm, which is an inductance of the resonant capacitor Cv and the primary winding Np of the transformer T, and the leakage inductance Llk, and the voltage of the main switch QM, the resonant switch QR, and each winding oscillates with its resonant cycle Tcvlm.

In the enable signal generator 130a, the ramp voltage VR begins to rise at the off time of the P1 signal. Since the lamp voltage VR should be able to detect the first zero crossing after the excitation current becomes zero, the enable signal generator 130a may be configured to start rising at the time when the LmC signal, the output of the excitation current detector 113, becomes zero.

In state (a) shown in FIG. 9A, the voltage of the Vfb signal is higher than the voltage of the reference voltage Vosc, so the voltage VT of the enable signal generator 130a is zero, and the Enb signal, the enable signal, is set to High at the time the P1 signal is set to Low in period T5.

The P2 delay circuit 143 sends out a signal with a preset pulse width by receiving the ZCD signal after the Enb signal goes to High, so in the state (a) in FIG. 9A, it outputs a signal P2Dy with a preset pulse width based on the first ZCD signal.

The preset pulse width means that the pulse width of the P2Dy signal is set to Tcvlm/4 in advance, since the ZCD signal detects the negative to positive zero crossing of the auxiliary winding voltage Vna, which oscillates with a cycle of Tcvlm. This makes the time t7 of the edge in the pulse signal of the P2Dy signal the minimum value of the voltage at both terminals of the resonant switch QR.

In the above example, the zero cross detector 112 detects the zero-crossing of the auxiliary winding voltage Vna from negative to positive, and P2Dy is described by Tcvlm/4. The zero cross detector 112 detects the zero crossing of the auxiliary winding voltage Vna from positive to negative, and even if the pulse width of P2Dy is set to (¾)×Tcvlm, the edge in the pulse signal of the P2Dy signal is the time t7 of, which is the minimum value of the voltage at both terminals of the resonant switch QR.

The period T7 is the period when the resonant switch QR is turned on and the negative excitation current is applied. The period T7 is the edge of the P2Dy signal, and the P2 generator 122 generates a P2 signal with a preset pulse width at the edge of the P2Dy signal and outputs it to the second driver 152.

The preset pulse width is set so that the energy stored by the negative current in the inductance of the primary winding Np of transformer T in period T7 charges the resonant capacitor Cv to make it above the voltage of the DC power supply Vin, thereby setting the main switch QM to zero volts.

The second turn-on timing of the resonant switch QR in one or more embodiments is the same timing as the conventional non-complementary control, but no resonant current flows.

Therefore, the on-width Ton2 of the P2 signal, which is the pulse for the capacitance of the resonant capacitor Cv to become zero, is shown by the following EQ.(2), where the voltage of the resonant capacitor Cr is the voltage Vr.

14

$$T_{on2} = \sqrt{L_m \cdot C_r} \cdot \sin^{-1}\left(\frac{1}{V_r}\sqrt{\frac{C_v}{C_r}} \cdot \sqrt{V_{in}(V_{in}-2\cdot V_r)}\right) \quad (2)$$

The average value of the voltage Vr of the resonant capacitor Cr is shown in EQ.(3) below, considering Vr=N·Vo since the turn ratio N=Np/Ns times the output voltage Vo.

$$T_{on2} = \sqrt{L_m \cdot C_r} \cdot \sin^{-1}\left(\frac{1}{V_r}\sqrt{\frac{C_v}{C_r}} \cdot \sqrt{V_{in}(V_{in}-2\cdot N\cdot V_o)}\right) \quad (3)$$

Therefore, if Ton2max is the on-width of Ton2 that allows ZVS when the maximum input voltage is Vinmax, then the following EQ.(4) is shown.

$$T_{on2max} = \sqrt{L_m \cdot C_r} \cdot \sin^{-1}\left(\frac{1}{V_r}\sqrt{\frac{C_v}{C_r}} \cdot \sqrt{V_{inmax}(V_{inmax}-2\cdot N\cdot V_o)}\right) \quad (4)$$

The P2 generator 122 generates a P2 signal with a preset pulse width Ton2max at the edge of the P2Dy signal and outputs it to the driver circuit 2, so that ZVS is possible even if the input voltage drops.

The above is an example of a setting, and the ON width given by the above formula at Vintyp when the input voltage is smaller than Vinmax may be set in advance as Ton2typ. In this case, the device will be turned on at the minimum point of voltage instead of ZVS when the input voltage is at its maximum value, but the negative current may be reduced, which has the advantage of higher efficiency when the input voltage is less than Vtyp.

Since the optimal Ton2 pulse width is correlated to the output and input voltages, the P2 generator 122 may detect the input and output voltages and incorporate a circuit to correct Ton2 with the input and output voltages to enable optimal ZVS. In addition, the P2 generator 122 enables optimal ZVS even if the input or output voltage is changed, and a highly efficient power supply may be configured.

In the period T8, the P0 timing generator 141 sends out a POS signal with a preset pulse width from the edge of the P2 signal and ends when the P0 signal is set to High on the edge of the POS signal and the main switch QM turns on.

When the resonant switch QR turns off at the time t8, this is the period when the resonant capacitor Cv is discharged by the negative current flowing in the inductance of the primary winding Np.

The period T8 is the resonant operation of the inductance component of the primary winding Np and the resonant capacitor Cv. In the period T8, the voltage of the main switch QM drops due to voltage resonance, and the time DT from the resonant switch QR turning off to the minimum point of resonant voltage is shown in EQ.(5) below, assuming the resonant cycle is Tcvlm.

$$DT = \left[\pi - \cos^{-1}\left(\frac{Vr}{Vin-Vr}\right)\right] \cdot \frac{Tcvlm}{2\pi} \quad (5)$$

The P0 timing generator 141 sends out a POS signal with a pulse width set in advance from the edge of the P2 signal based also on the above formula.

Since Vac=N·Vo, the time DT is shown in EQ.(6) below.

$$DT = \left[\pi - \cos^{-1}\left(\frac{N \cdot Vo}{Vin - N \cdot Vo}\right)\right] \cdot \frac{Tcvlm}{2\pi} \qquad (6)$$

By taking a circuit in which the P0 timing generator 141 detects input and output voltages and corrects the pulse width of the POS signal in input/output conditions, more optimal ZVS is possible, and input voltage may be varied to configure a highly efficient power supply. Therefore, the P0 timing generator 141 may incorporate a circuit that detects input and output voltages and corrects the pulse width of the POS signal under input/output conditions.

Figure 9B:
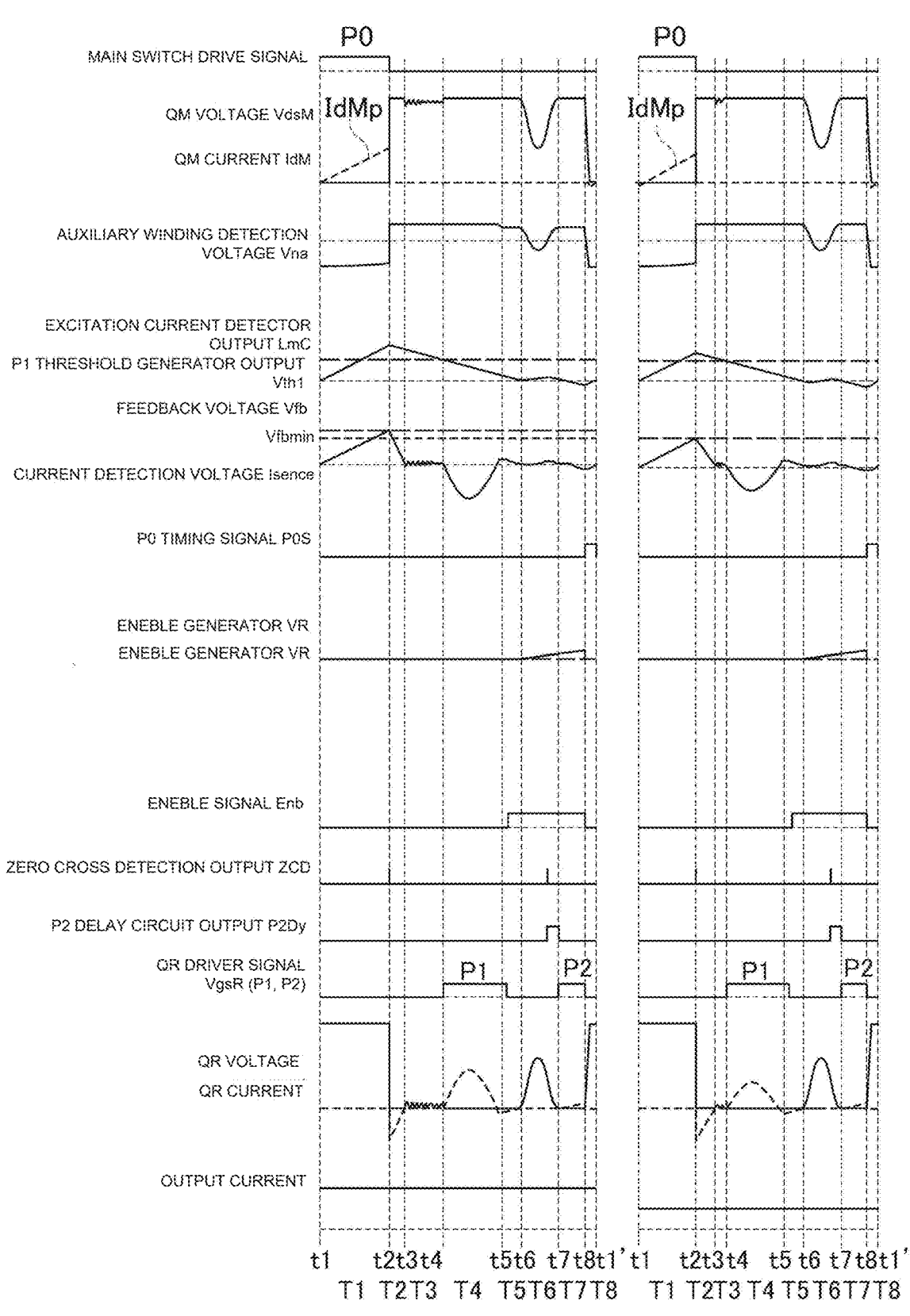
FIG. 9B is a diagram illustrating an operating waveforms of a first half-wave rectifier LLC converter of a first embodiment.

The state (b) shown in FIG. 9B is the operating waveform when the output current is lower than the state (a) shown in FIG. 9A. The voltage of the Vfb signal in the state (b) shown in FIG. 9B is lower than the Vfb signal in the state (a). Therefore, the current peak IdMp is controlled at a lower value than in the state (a), which shortens the period T3. The value of the Vfb signal is slightly higher than the value of the reference voltage Vfbmin, so the operation is the same as in the state (a) after the period T4.

The state (c) shown in FIG. 9B is the operating waveform when the output current is further reduced and the voltage of the Vfb signal becomes equal to the value of the reference voltage Vfbmin. As in the state (b) shown in FIG. 9B, IdMp is controlled at a lower value and the period T3 becomes shorter, but the value of the Vfb signal is equal to the value of the reference voltage Vfbmin. Therefore, after the period T4, the operation is the same as the state (a) shown in FIG. 9A.

Figure 9C:
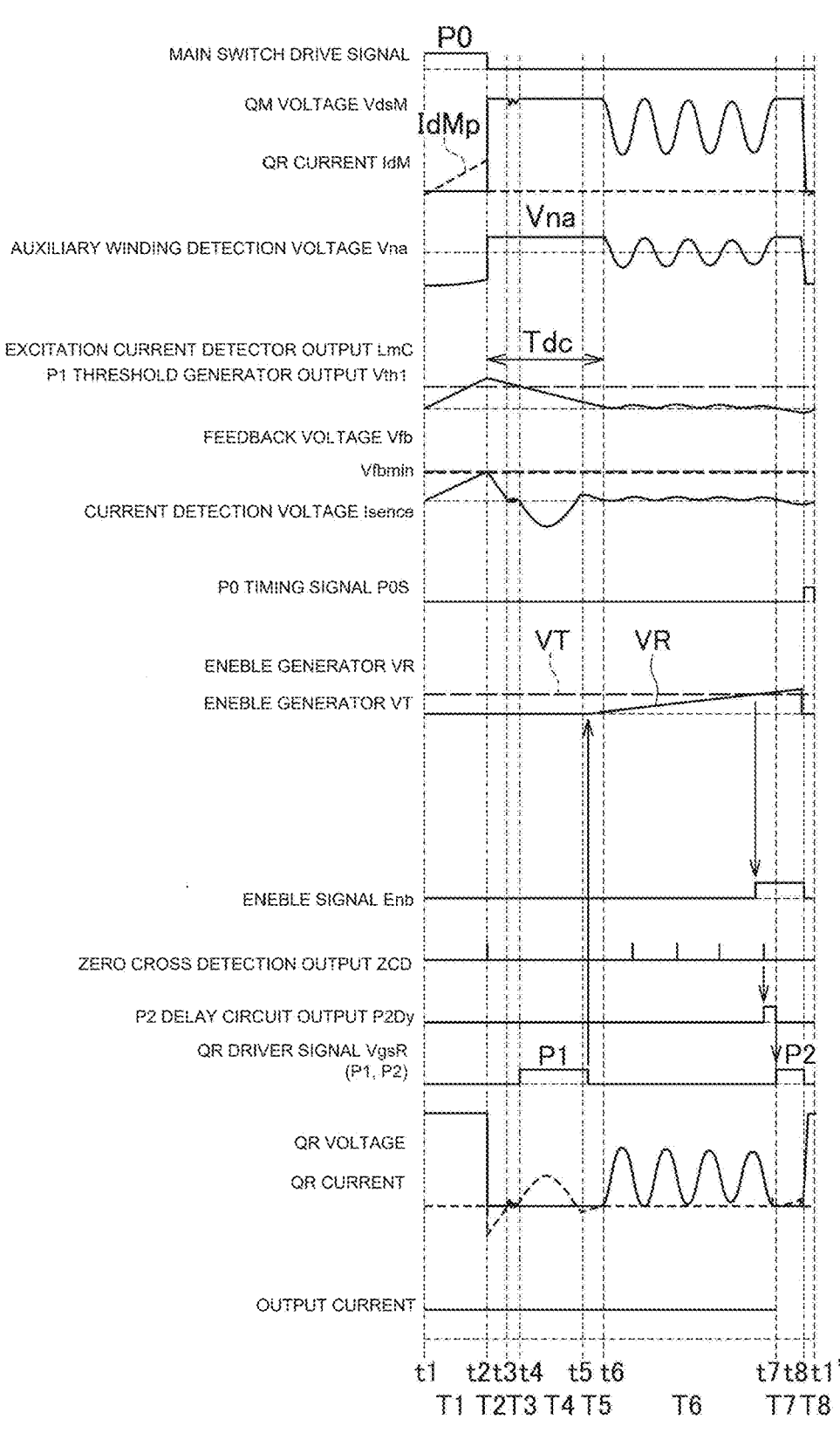
FIG. 9C is a diagram illustrating an operating waveforms of a half-wave rectifier LLC converter of a first embodiment.

The state (d) shown in FIG. 9C is the operating waveform when the output current is further reduced and Vfb is slightly lower than Vfbmin. In addition, IdMp in the state (d) shown in FIG. 9C is limited to about the same degree as the state (c) shown in FIG. 9B. Furthermore, IdMp in the state (d) shown in FIG. 9C amplifies the slight potential difference between the value of the Vfb signal and the value of the reference voltage Vfbmin, resulting in a higher voltage VT and a longer period T6 due to the delay of the Enb signal, allowing constant control of the output voltage.

Figure 9D:
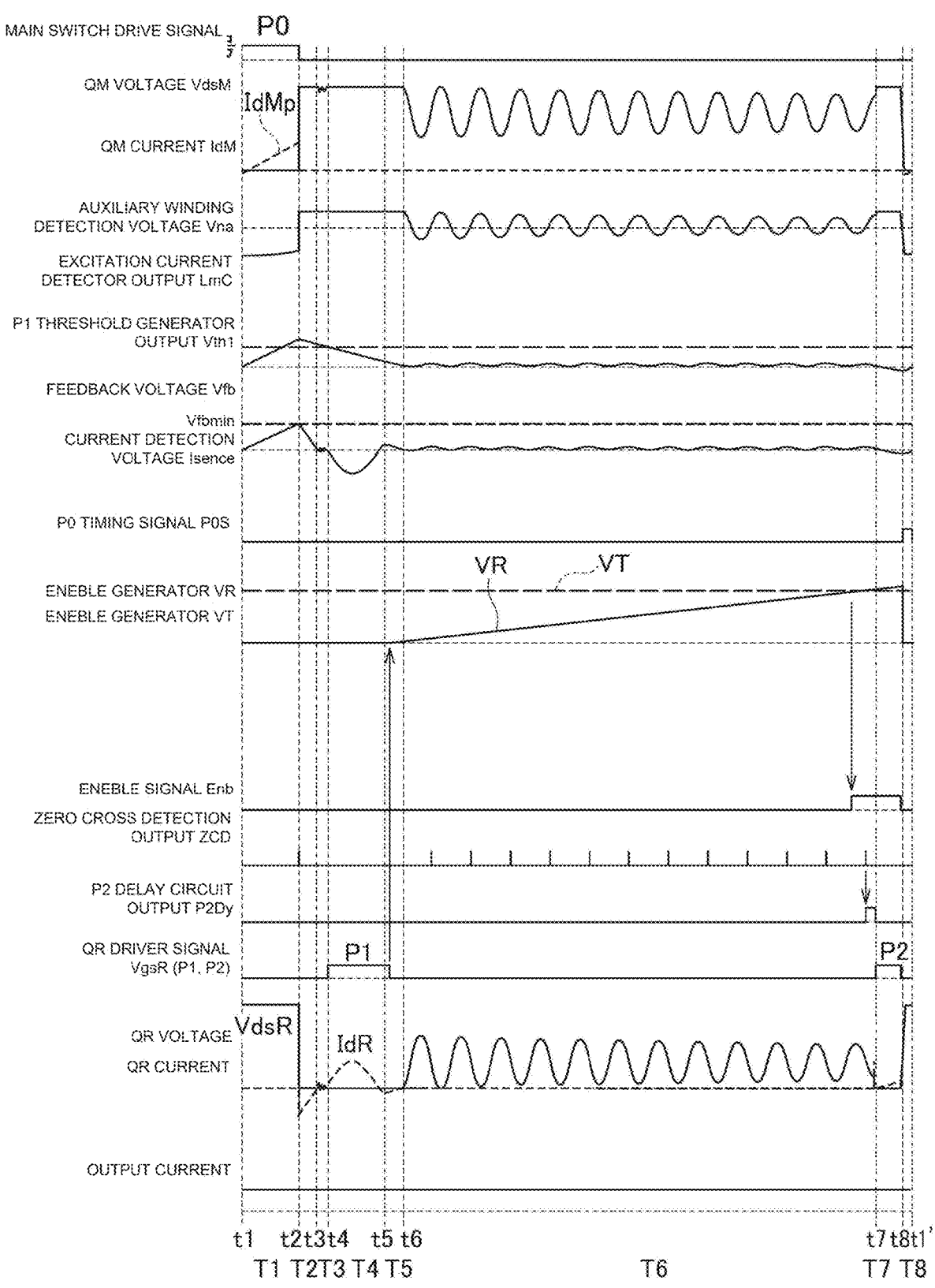
FIG. 9D is a diagram illustrating an operating waveforms of a half-wave rectifier LLC converter of a first embodiment.

The state (e) shown in FIG. 9D is the operating waveform when the output current is even lower than the state (d) shown in FIG. 9C. IdMp is almost the same, and the period T6 is longer and the output voltage is controlled constant.

As described above, the controller 100a of the half-wave LLC converter 10 of the first embodiment includes an excitation current detector 113 that detects the excitation current of the transformer T to generate the timing of the time t4. Based on the LmC signal, which is the output of the excitation current detector 113, the control IC determines the timing of the period T4 at the time when the excitation current reaches a predetermined threshold signal Vth1 value. FIG. 7 is an example of the circuit configuration of the excitation current detector 113, which integrates the winding voltage of transformer T to obtain a voltage proportional to the excitation current.

As described above, the controller 100a includes an excitation current detector 113 that detects the excitation current of the transformer T and outputs a first voltage signal proportional to the excitation current, and an output voltage detector 111 that outputs a second voltage signal proportional to the output voltage. The first voltage signal corresponds to the LmC signal. The second voltage signal corresponds to the VoD signal. The controller 100a sets the timing of turning on the second drive signal based on the first voltage signal and the threshold value set based on the second voltage signal, so that part of the excitation current flows to the rectifier-smoothing circuit. As a result, the slope of the excitation current when it decreases becomes slower when the output voltage is lower and steeper when the output voltage is higher, so that the value of the threshold signal Vth1 is adjusted in proportion to the output voltage.

Furthermore, the controller 100a detects the time when the voltage at both terminals of the resonant switch QR reaches a minimum value, and controls the on-time of the resonant switch QR, which is the start time of the period T7, to the time when the voltage at both terminals of the resonant switch QR reaches a minimum value. The controller 100a includes a zero cross detector 112 that detects the zero cross time of the voltage of the auxiliary winding Na and sends out a zero cross signal (ZCD signal) as a method of detecting the time when the voltage at both terminals of the resonant switch QR reaches a minimum value. The controller 100a also includes a P2 generator 122 that sends out a P2 signal to turn on the resonant switch QR after a predetermined delay time based on this ZCD signal.

Furthermore, the P2 generator 122 includes a P2 delay circuit 143 that delays the P2Dy signal based on the signal of the enable signal generator 130a. This allows the half-wave LLC converter 10 to lengthen the period T6 and reduce the frequency when the load current decreases.

As described above, the controller 100a in the first embodiment may include a first output voltage control circuit that controls the on-width of the main switch QM as a circuit that controls the output voltage. It may also include, as a circuit that controls the output voltage, a second output voltage control circuit that controls the period T6 during which both the main switch QM and the resonant switch QR are off. Thus, compared to the control method for the related technology, the circulating current is reduced and ZVS is possible over a wide range of output current, resulting in a highly efficient and low-noise power supply.

Second Embodiment

As shown in FIGS. 9A through 9D, the change in operating frequency in the first embodiment is the highest frequency at the point where the first output voltage control circuit, which controls the on-width of the main switch QM, and the second output control circuit, which controls the period T6, are switched. For example, in order to make a power supply smaller, it may be necessary to increase the operating frequency when the output current is high and reduce the size of the transformer T and capacitors, which are passive components that make up the power supply.

As a second embodiment, a method of controlling the operating frequency by coordinating the first and second output control circuits is described below to achieve an even more highly efficient and compact power supply.

Figure 10:
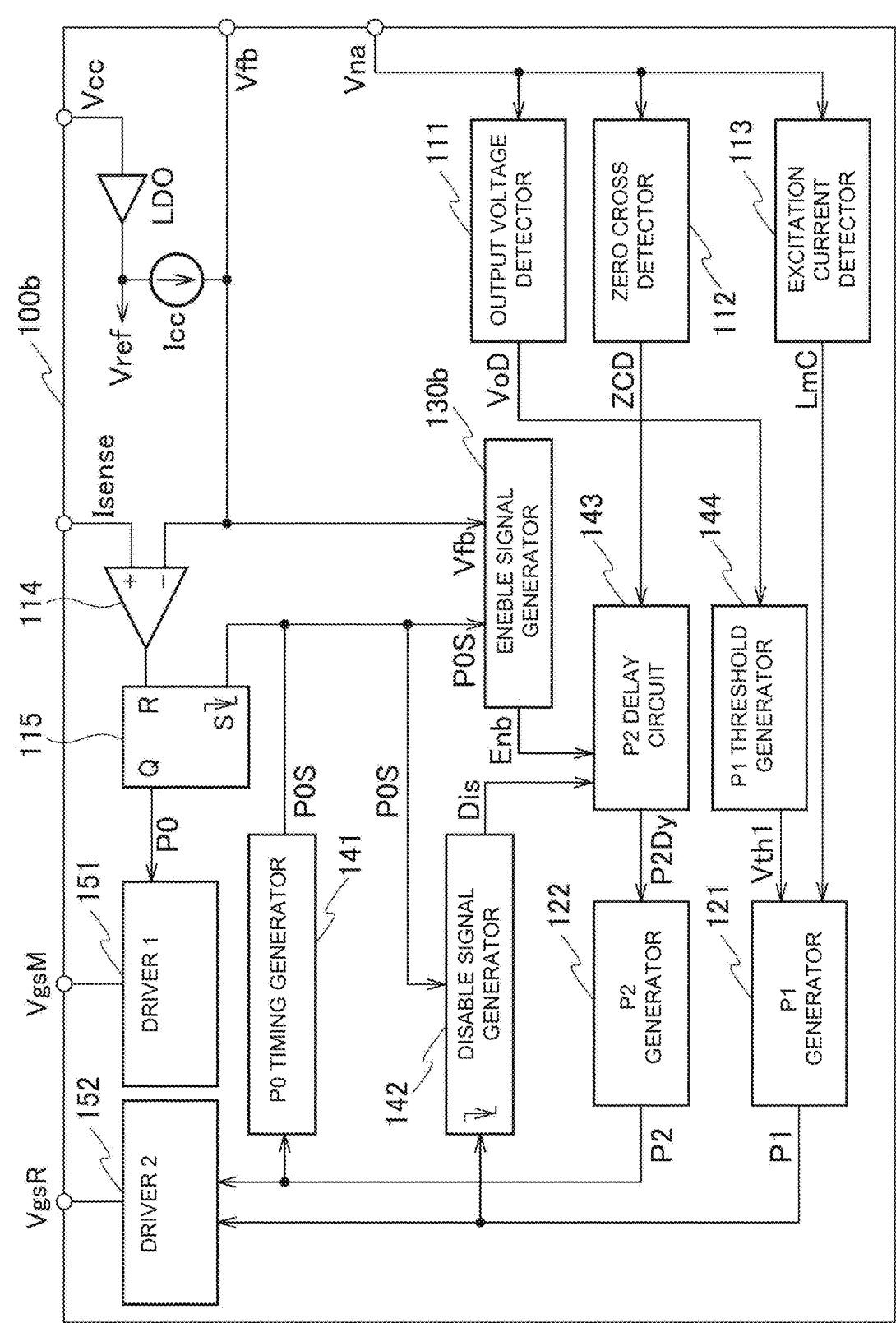
FIG. 10 is a block diagram illustrating a controller according to a second embodiment.

FIG. 10 is a block diagram showing the controller 100b for realizing the control of the half-wave LLC converter 10 in the second embodiment.

The controller 100B for the second embodiment differs from the controller 100A for the first embodiment in that it has a disable signal generator 142. The following is an explanation of the points that differ from the controller 100a pertaining to the first embodiment.

The controller 100b includes a disable signal generator 142 that outputs a disable signal Dis, which is set to High with the POS signal and is set to Low after a preset delay time upon receiving the P1 signal, to the P2 delay circuit 143.

The controller 100*b* also includes an enable signal generator 130*b* that is reset by the POS signal and outputs an Enb signal, a pulse signal based on the voltage of the Vfb signal, to the P2 delay circuit 143.

Furthermore, the controller 100*b* includes a P2 delay circuit 143 that receives a Dis signal, an Enb signal, and a ZCD signal, triggers the ZCD signal when the Dis signal is set to Low and the Enb signal is set to High, and outputs the P2Dy signal to the P2 generator 122.

Figure 11:
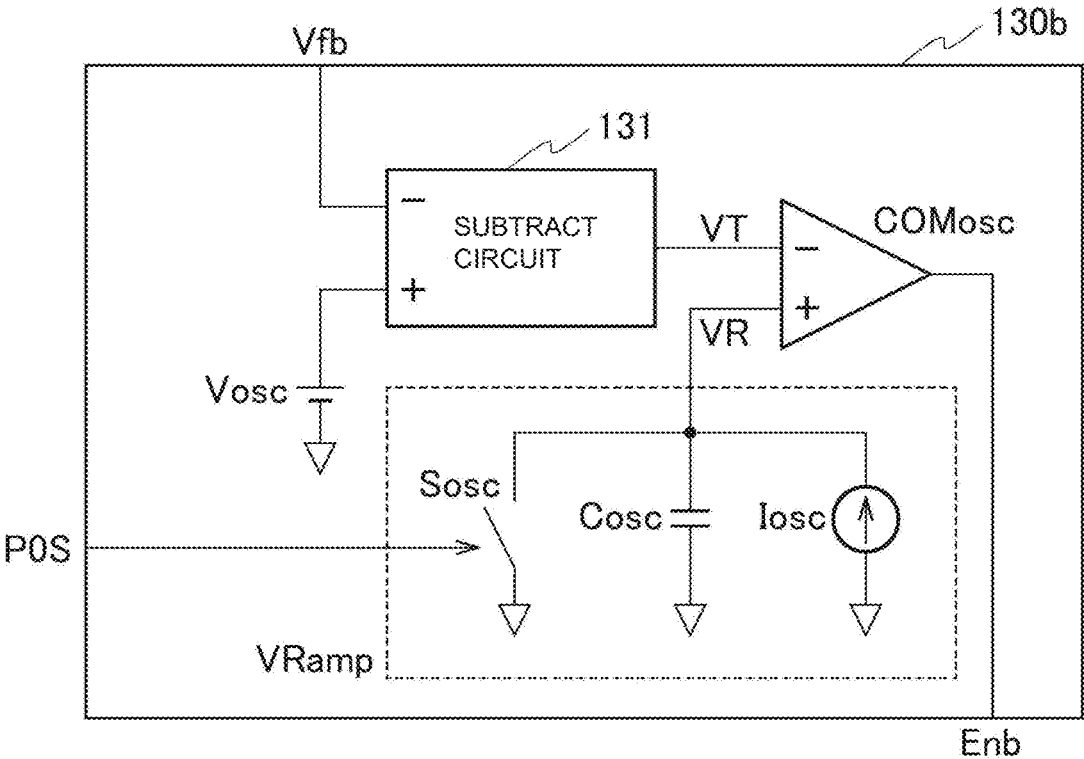
FIG. 11 is a diagram illustrating a configuration of an enable signal generator according to a second embodiment.

FIG. 11 shows the configuration of the enable signal generator 130*b* of the controller 100*b* for the second embodiment.

The enable signal generator 130*b* includes a reference voltage Vosc, a subtraction circuit that outputs a voltage VT subtracted from the reference voltage Vosc by the voltage of the Vfb signal, and a reference current Iosc. The enable signal generator 130*b* also includes a Vramp circuit, in which a capacitor Cosc, which charges the reference current Iosc, and a switch Sosc, which resets the capacitor Cosc, are connected in parallel, and when the POS signal goes to low, Iosc charges Cosc to generating a ramp voltage VR. The enable signal generator 130*b* includes a comparator COMosc with voltage VT connected to the negative terminal and lamp voltage VR connected to the positive terminal, and sends out an Enb signal, a pulse signal that is set to High when lamp voltage VR exceeds voltage VT.

Figure 12:
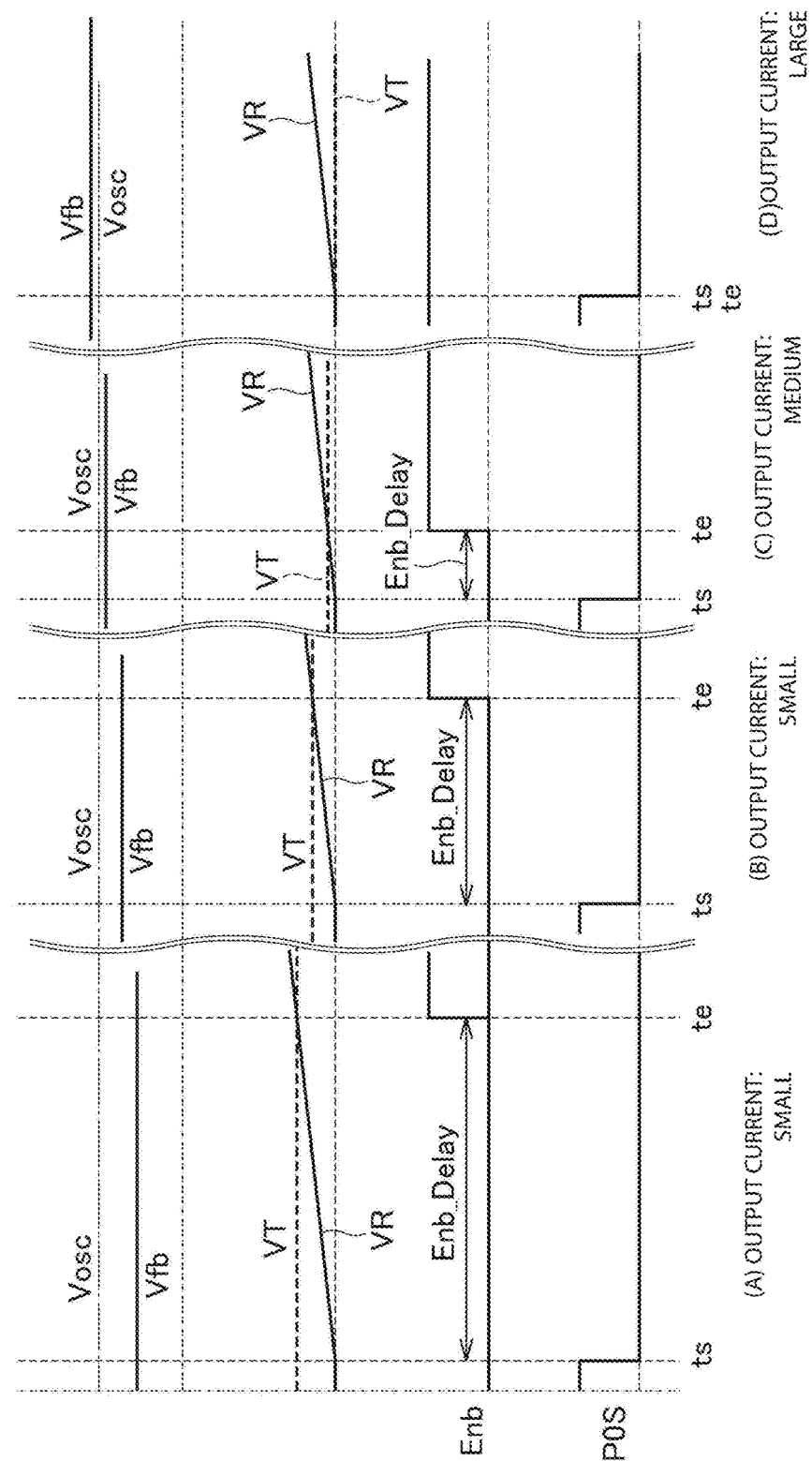
FIG. 12 is a diagram illustrating an operating waveforms of an enable signal generator according to a second embodiment.

FIG. 12 shows the operating waveform of the enable signal generator 130*a* of FIG. 11. The states (a) to (d) shown in FIG. 12 show the operating waveforms when the output current increases as one moves to the right in the figure. The voltage of the Vfb signal increases as the output current increases due to the configuration of the output voltage detector 200 and the controller 100*b*.

Since the reference current Iosc is a preset current source, the slope of the ramp voltage VR increases at a constant rate. As the output current increases, the value of the Vfb signal increases, and as the difference from the voltage of the reference voltage Vosc decreases, the voltage VT decreases, so the time until the Enb signal is set to High becomes shorter. When the value of the Vfb signal is higher than the value of the reference voltage Vosc, the Enb signal is set to High when the POS signal is set to Low.

Figure 13:
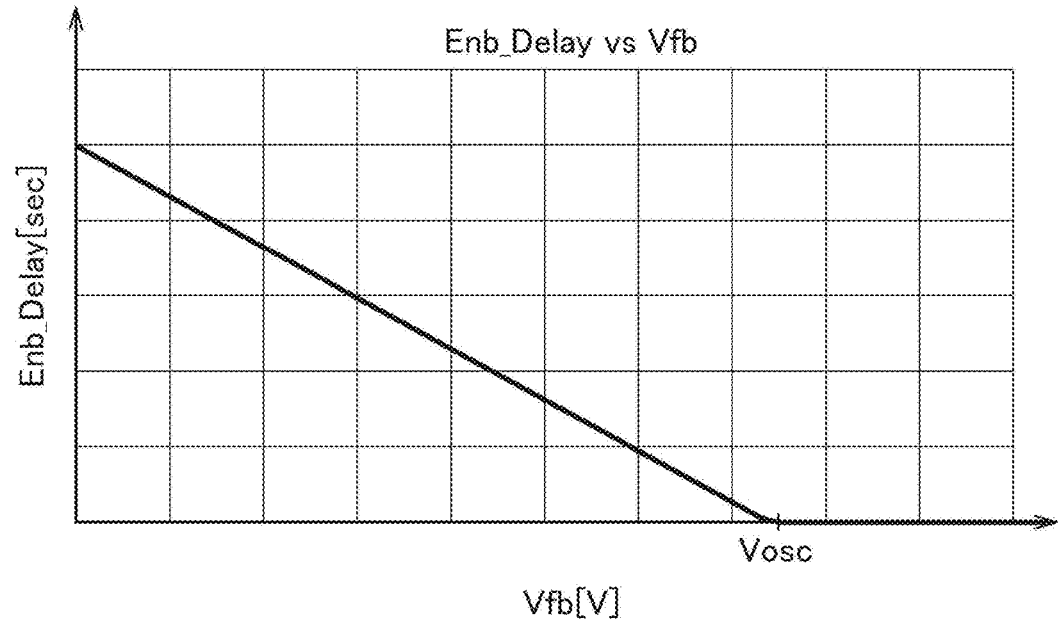
FIG. 13 is a diagram illustrating a characteristics of an enable signal generator according to a second embodiment.

FIG. 13 shows the characteristics of the enable signal generator 130*b* of FIG. 11. The horizontal axis shows the value of the Vfb signal, and the vertical axis is Enb_Delay, the time from when Sosc turns off until the Enb signal is set to High.

The reference current Iosc is a preset current source, and the slope of the ramp voltage VR increases at a constant rate. The voltage VT is the difference between the preset reference voltage Vosc and the voltage of the Vfb signal. Therefore, as shown in FIG. 13, the characteristic of the enable signal generator 130*b* for the second embodiment, Enb_Delay, the time from when the switch Sosc is turned off until the Enb signal is set to High, is shown in EQ.(7) below. As shown in EQ.(7), the time Enb_Delay is controlled to be negatively proportional to the Vfb signal with respect to the Vfb signal, provided that a=−(Cosc/Iosc), and b=Cosc× (Vosc/Iosc).

$$\text{Enb\_Delay} = a \times V f b + b \, (a < 0, B > 0) \qquad \text{EQ. (7)}$$

18

FIGS. 14A through 14D show the operating waveforms of the half-wave LLC converter 10 applying the controller 100*b* of the half-wave LLC converter 10 of the second embodiment.

The state (a) to the state (d) shown in FIG. 14A to FIG. 14D are the operating waveforms when the output current decreases as one goes from the state (a) to the state (d). The voltage of the Vfb signal decreases as the output current decreases due to the configuration of the output voltage detector 200 and controller 100*b*.

Figure 14A:
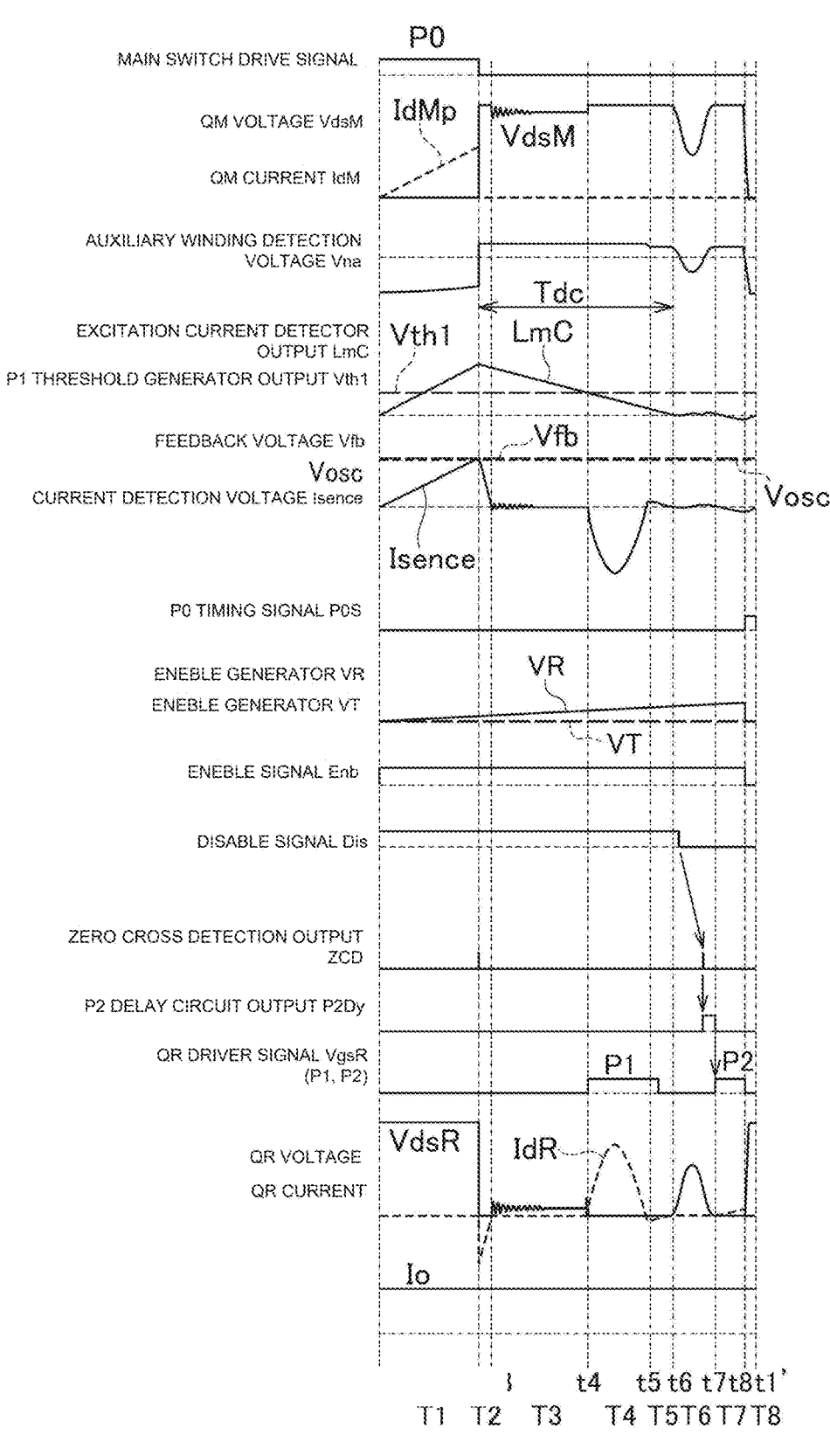
FIG. 14A is a diagram illustrating an operating waveforms of a half-wave rectifier LLC converter of a second embodiment.

The state (a) shown in FIG. 14A is the operating waveform when the output current is high and the voltage of the Vfb signal is higher than the voltage of the reference voltage Vosc.

The operation of period T1 is the same as in the first embodiment shown in FIGS. 9A through 9D.

When the main switch QM turns off at time t2, the auxiliary winding voltage Vna crosses zero from negative to positive, but in the state (a) in FIG. 14A, the voltage VT of the enable signal generator 130*b* is zero because the Vfb voltage is higher than the reference voltage Vosc voltage. In addition, the enable signal, Enb signal, is high, but the output of the P2 delay circuit 143 remains zero because the disable signal Dis is high.

The operation in periods T2 through T6 is the same as that in the first embodiment shown in FIGS. 9A to 9D.

The disable signal generator 142 is set to Low after a preset delay time from the turn off time of the P1 signal. Since the turn off time of the P1 signal is generated based on the time when the excitation current becomes zero, the preset delay time is set so that the first zero cross after the excitation current becomes zero may be detected. In one or more embodiments shown in FIGS. 14A to 14D, the delay time is set to be immediately after the time t6 when the excitation current becomes zero.

In the state (a) shown in FIG. 14A, the voltage of the Vfb signal is higher than the voltage of the reference voltage Vosc, so the voltage VT of the enable signal generator 130*b* is zero and the enable signal, Enb signal, is already set to High.

The P2 delay circuit 143 outputs a signal with a preset pulse width based on the ZCD signal after the Enb signal is set to High and the Dis signal is set to Low. Therefore, in the state (a) shown in FIG. 14A, the P2 delay circuit 143 outputs the signal P2Dy with a preset pulse width based on the ZCD signal after the Dis signal is set to Low.

The ZCD signal output from the zero cross detector 112 detects the negative to positive zero crossing of the auxiliary winding voltage Vna, which oscillates with a resonant cycle of Tcvlm. Therefore, by setting the pulse width of the P2Dy signal to Tcvlm/4 in advance, the time t7 of the edge in the pulse signal of the P2Dy signal is the minimum value of the voltage at both terminals of resonant switch QR.

In one or more embodiments, the zero cross detector 112 detects the zero crossing of the auxiliary winding voltage Vna from negative to positive. The P2Dy signal detects the zero crossing where the zero cross detector 112 detects the zero-crossing where the Vna voltage goes from positive to negative, and even if the pulse width of the P2Dy signal is (¾)×Tcvlm, the edge in the P2Dy signal pulse signal is at time t7. This makes the P2Dy signal the minimum value of the voltage at both terminals of the resonant switch QR.

The operation of periods T7 and T8 may be the same as in the first embodiment shown in FIGS. 9A through 9D.

Figure 14B:
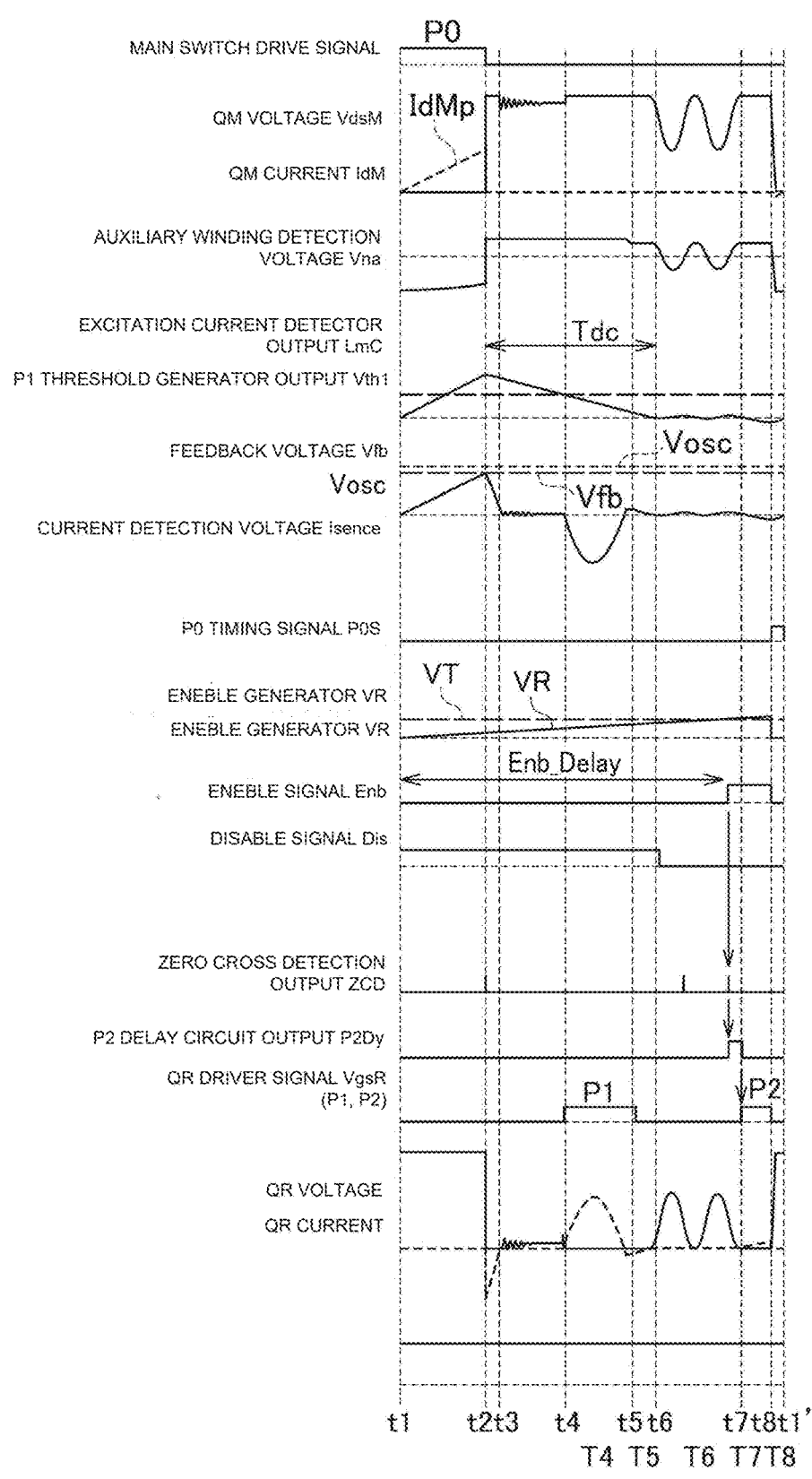
FIG. 14B is a diagram illustrating an operating wave-forms of a half-wave rectifier LLC converter of a second embodiment.

The state (b) shown in FIG. 14B is the operating waveform when the output current is lower than the state (a) shown in FIG. 14A, and the Vfb voltage is lower than the reference voltage Vosc.

The lower voltage of the Vfb signal lowers IdMp, the current peak of IdM, and the period T1 becomes shorter. Since the voltage of the Vfb signal is now lower than the value of the reference voltage Vosc, the enable signal generator 130b outputs a voltage VT based on the difference between Vosc and the value of the Vfb signal, and the Enb_Delay time becomes longer. This causes the Enb signal to be set to High later than the time when the Dis signal is set to Low. Therefore, the P2Dy signal is sent out based on the ZCD signal after the Enb signal being set to High, and the on P2 signal is also output, and in the state (b), the resonant switch QR turns on at the minimum value of the second voltage oscillation. Therefore, periods T1 and T3 are shortened, but period T6 is lengthened and the operating frequency is lowered.

Figure 14C:
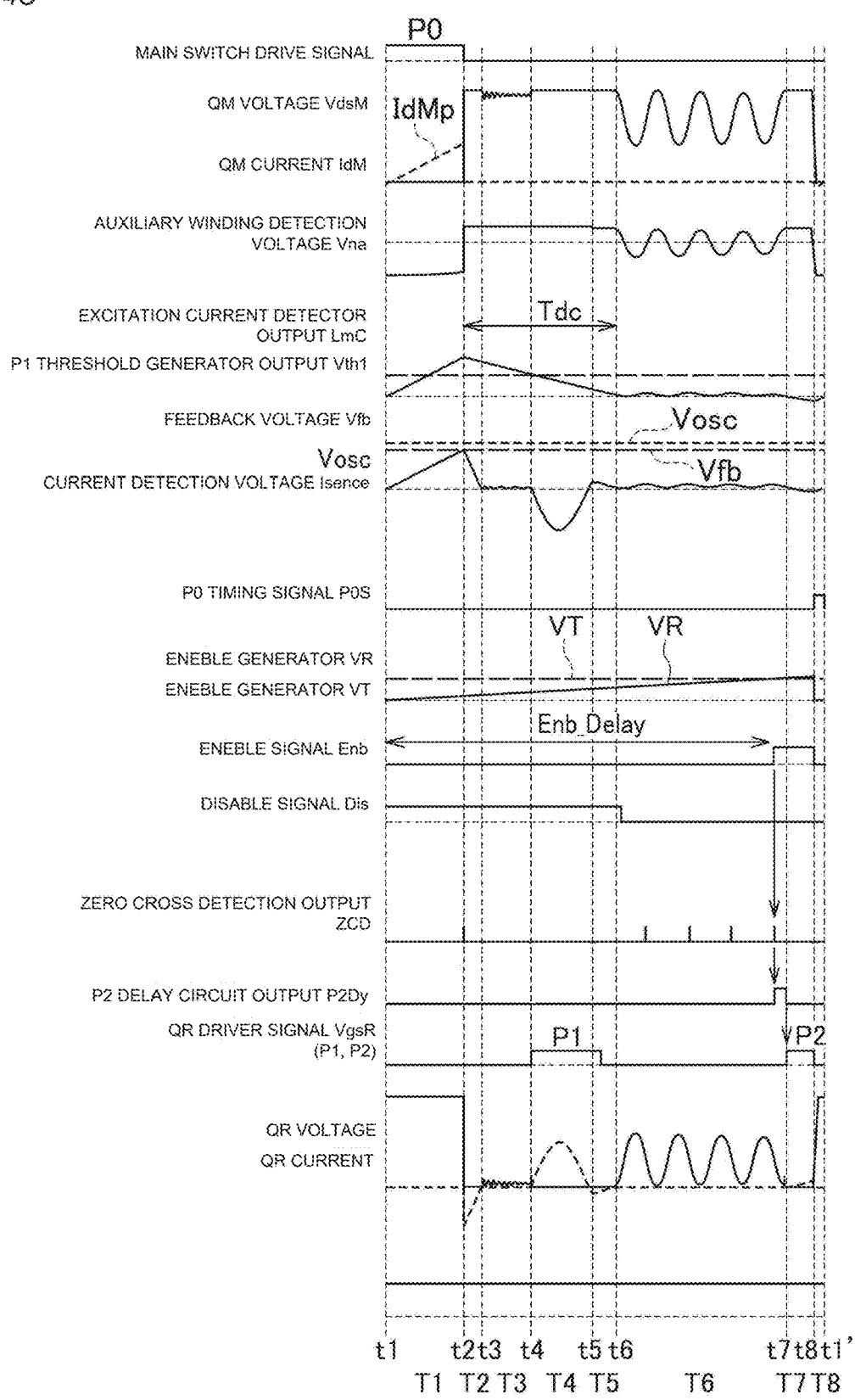
FIG. 14C is a diagram illustrating an operating wave-forms of a half-wave rectifier LLC converter of a second embodiment.
Figure 14D:
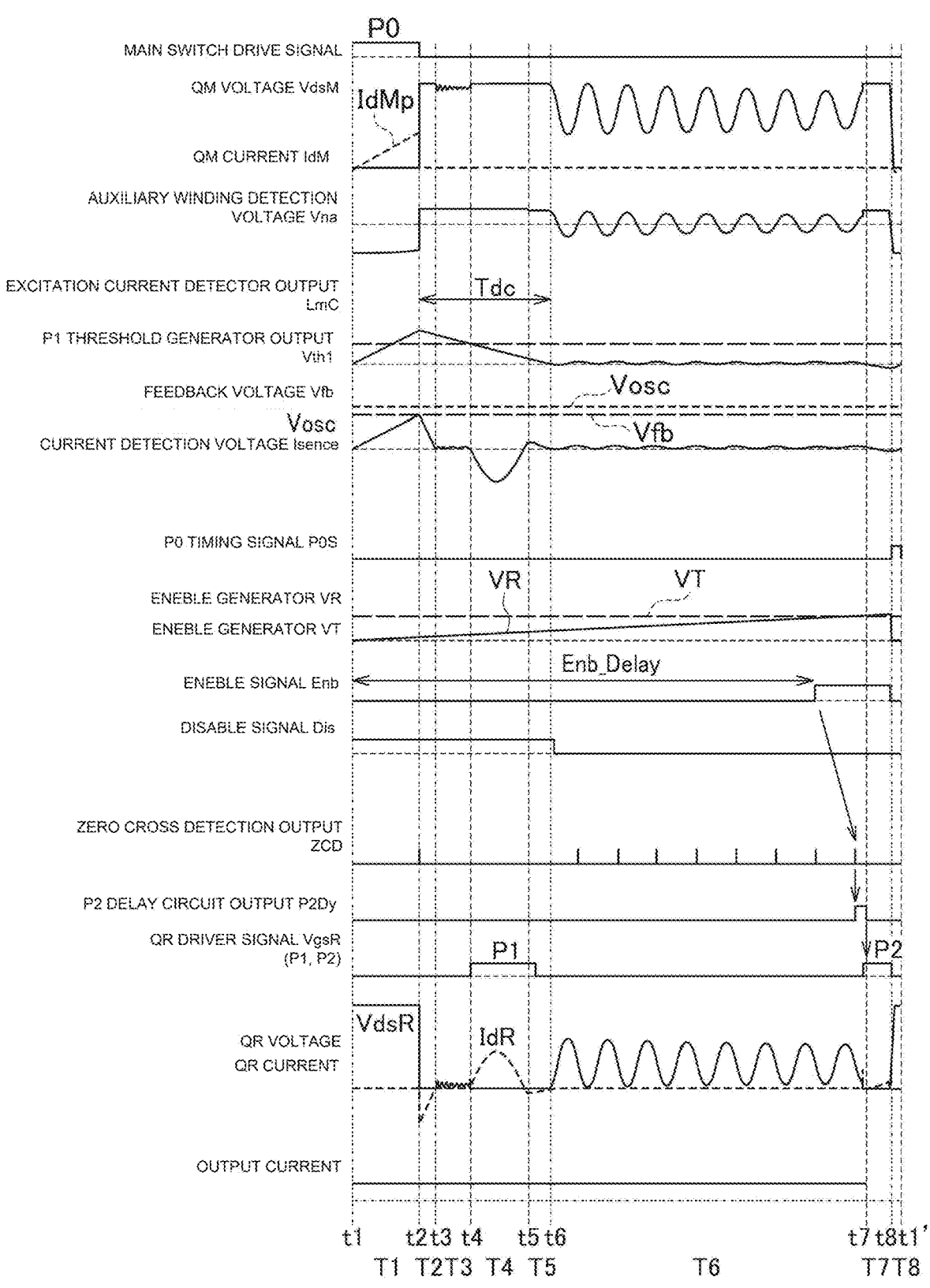
FIG. 14D is a diagram illustrating an operating wave-forms of a half-wave rectifier LLC converter of a second embodiment.

The state (c) and the state (d) shown in FIGS. 14C and 14D are operating waveforms when the output current is even lower than the state (b) shown in FIG. 14B, and the voltage of the Vfb signal is even lower than the voltage of the reference voltage Vosc.

The lower voltage of the Vfb signal lowers the current peak of IdL even further, making period T1 even shorter, period T1 and period T3 shorter, but period T6 longer, further lowering the operating frequency.

Comparing the operating frequency of the half-wave LLC converter 10 of the first embodiment with that of the half-wave LLC converter 10 of the second embodiment, both remain the same at 106 kHz when the output current is 3 A. When the output current is 2 A, the operating frequency changes from 131 kHz to 108 kHz. When the output current is 1.5 A, the operating frequency changes from 151 kHz to 89 kHz. When the output current is 1 A, the operating frequency changes from 101 kHz to 71 kHz. Furthermore, when the output current is 0.5 A, the operating frequency changes from 54 kHz to 48 kHz.

Figure 15:
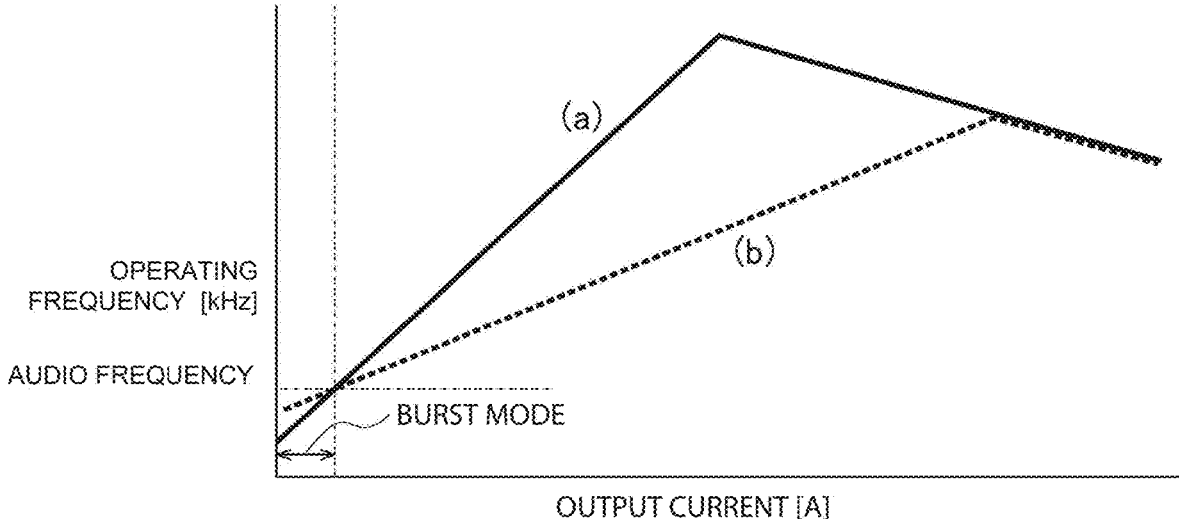
FIG. 15 is a diagram illustrating an operating frequency variation with output current in a first and second embodiments.

FIG. 15 shows the operating frequency in the second embodiment. The state (a) in FIG. 15 is the variation of the operating frequency in the output current of the first embodiment. The state (b) in FIG. 15 is the variation of the operating frequency in the output current of the second embodiment.

Therefore, compared to the control method of the first embodiment, frequency fluctuations may be suppressed and a more efficient and low-noise power supply may be realized in the output fluctuation range.

Third Embodiment

The first and second embodiments have been described using a control method in which the resonant switch is controlled twice during the time when the main switch is off. The first control of the resonant switch is characterized by timing that may reduce the circulating current and provide a highly efficient converter. The second control of the resonant switch is to achieve ZVS of the main switch and provide a high efficiency and low noise power supply. However, depending on the input voltage, output voltage, and transformer turn ratio, the voltage oscillation in period T6 may be increased and the second control of the resonant switch may not be necessary, and in the first and second embodiments, it may be possible to change to a control method without the second control of the resonant switch.

Other Embodiments

The embodiments have been described in detail with reference to the drawings, but the embodiments are not limited by what is described in the above embodiments. Also, the components described above include those that may be easily assumed by those skilled in the art and those that are substantially the same. Furthermore, the configurations described above may be combined as appropriate. In addition, various omissions, substitutions, or modifications of the configuration may be made to the extent that the gist of the embodiments is not departed from.

The characteristics of the half-wave LLC converter 10 and control IC are described below.

The half-wave LLC converter 10 and control IC according to the first embodiment includes a first series circuit in which the main switch QM and the resonant switch QR are connected in series at both terminals of the DC power supply Vin. The half-wave LLC converter 10 and control IC also include a second series circuit in which the primary winding Np and the resonant capacitor Cr are connected in series at both terminals of the resonant switch QR. The half-wave LLC converter 10 and control IC also includes a transformer T including a primary winding Np and a secondary winding Ns electromagnetically coupled with the primary winding Np with opposite polarity. The half-wave LLC converter 10 and control IC also includes a controller 100a that controls the main switch QM and the resonant switch QR. The half-wave LLC converter 10 and control IC also includes a rectifying and smoothing circuit that rectifies and smoothes the voltage of the secondary winding Ns and an output voltage detector 200 that detects the output voltage of the rectifying and smoothing circuit. The controller 100a includes a first drive signal to control the main switch QM and a second drive signal to control the resonant switch QR during the period when the main switch QM is off. The controller 100a has a flyback period during which energy stored in the transformer is released from the secondary winding after the main switch is controlled by the first drive signal, the resonant switch is turned on by the second drive signal during the flyback period, resonant current flows, and after the resonant current stops flowing, the second drive signal is generated so that the resonant switch is turned off by the second drive signal during the excitation current charging period when the excitation current charges the resonant capacitor.

With this configuration, the half-wave LLC converter 10 and control IC may provide a highly efficient power supply with reduced circulating current.

The half-wave LLC converter 10 and control IC according to the second embodiment include a first series circuit in which the main switch QM and the resonant switch QR are connected in series at both terminals of the DC power supply Vin. The half-wave LLC converter 10 and control IC also include a second series circuit in which the primary winding Np and the resonant capacitor Cr are connected in series at both terminals of the resonant switch QR. The half-wave LLC converter 10 and control IC also includes a transformer T including a primary winding Np and a secondary winding Ns electromagnetically coupled with the primary winding Np with opposite polarity. The half-wave LLC converter 10 and control IC also includes a controller 100a that controls the main switch QM and the resonant switch QR. The half-wave LLC converter 10 and control IC also includes a rectifying and smoothing circuit that rectifies and smoothes the voltage of the secondary winding Ns and an output voltage detector 200 that detects the output voltage of the rectifying and smoothing circuit. The controller 100*a* includes a first drive signal to control the main switch QM, a second drive signal to control the resonant switch QR during the period when the main switch QM is off, and a third drive signal to control the resonant switch after the second drive signal. After the main switch is controlled by the first drive signal, the controller 100A has a flyback period during which the energy stored in the transformer is released from the secondary winding, and the resonant switch is turned on by the second drive signal during the flyback period and the resonant current flows. After the resonant current stops flowing, the controller 100*a* generates the second drive signal to turn off the resonant switch by the second drive signal during the excitation current charging period when the excitation current charges the resonant capacitor.

With this configuration, the half-wave LLC converter 10 and control IC may provide a high-efficiency, low-noise power supply with reduced circulating current.

The controller 100*a* of the half-wave LLC converter 10 and control IC according to the third embodiment may have an excitation current detector 113 that detects the excitation current of the transformer T and outputs a first voltage signal proportional to the excitation current. The controller 100*a* may also have an output voltage detector 111 that outputs a second voltage signal proportional to the output voltage. The controller 100*a* may set the timing for controlling of the second drive signal based on the first voltage signal and a threshold value set based on the second voltage signal, so that the energy stored in the transformer is released from the secondary winding during a flyback period, and during the flyback period, the second drive signal may turn on the resonant switch, the resonant current flows, and after the resonant current stops flowing, the second drive signal may be generated so that the resonant switch is turned off by the second drive signal during the excitation current charging period when the excitation current charges the resonant capacitor.

This configuration allows the half-wave LLC converter 10 and control IC to provide a high-efficiency, low-noise power supply with reduced circulating current even when the output voltage varies.

The controller 100*a* of the half-wave LLC converter 10 and control IC according to the fourth embodiment may have an excitation current detector 113 that detects the excitation current of the transformer T and outputs a first voltage signal proportional to the excitation current. The controller 100*a* may also have a preset third voltage signal. The controller 100*a* controls the switching timing of the second drive signal based on the first voltage signal and the threshold value set based on the third voltage signal. The transformer has a flyback period during which the energy stored in the transformer is released from the secondary winding, and the controller 100*a* turns on the resonant switch by the second drive signal during the flyback period to flow the resonant current. After the resonant current stops flowing, the controller 100*a* may generate the second drive signal to turn off the resonant switch by the second drive signal during the excitation current charging period when the excitation current charges the resonant capacitor.

With this configuration, the half-wave LLC converter 10 and control IC may realize a high-efficiency, low-noise power supply with reduced circulating current with a simpler controller than in the second embodiment.

The controller 100*a* of the half-wave LLC converter 10 and the control IC according to the fifth embodiment may be provided with a zero cross detector 112 that outputs a zero cross signal indicating that a zero voltage is detected at which the voltage of the auxiliary winding Na of the transformer T changes from negative voltage to positive voltage or positive voltage to negative voltage. The controller 100*a* may further be provided with a second pulse generator that, based on the zero cross signal, sends out a second pulse signal to turn on the resonant switch QR after a predetermined delay time.

This configuration allows the half-wave LLC converter 10 and control IC to turn on at the minimum voltage of the resonant switch, resulting in high efficiency and low noise operation.

The controller 100*a* of the half-wave LLC converter 10 and control IC according to the sixth form may be provided with an enable signal generator 130*a* that generates an enable signal based on the feedback voltage detected by the output voltage detector 200. The controller 100*a* may further be provided with a second pulse delay circuit for delaying the third drive signal based on the zero cross signal and the enable signal. The second pulse delay circuit may delay the third drive signal so that the frequency is reduced when the load current decreases.

This configuration allows the half-wave LLC converter 10 and control IC to lengthen the period and reduce the frequency when the load current decreases.

The controller 100*b* of the half-wave LLC converter 10 and control IC according to the seventh embodiment, the controller 100*b* may also be provided with an enable signal generator 130*b* that generates an enable signal based on the feedback voltage detected by the output voltage detector 200. The controller 100*b* may also be provided with a disable signal generator 142 that generates a disable signal based on the second drive signal. The controller 100*b* may further be provided with a second pulse delay circuit for delaying the third drive signal based on the zero cross signal, the enable signal and the disable signal. The second pulse delay circuit may delay the third drive signal so that the frequency is reduced when the load current decreases.

With this configuration, the half-wave LLC converter 10 and control IC may provide a more efficient, low-noise power supply over a range of output variations, with reduced frequency fluctuations.

As explained above, the half-wave rectifier LLC converter and control IC of one or more embodiments may be able to prevent an increase in circulating current due to an increase in output current.

The invention claimed is:

1. A semiconductor apparatus having a half-wave rectifier LLC converter comprising:

a first series circuit comprising a main switch and a resonant switch, the main switch and the resonant switch being connected in series at terminals of a DC power supply;

a second series circuit comprising a primary winding and a resonant capacitor, the primary winding and the resonant switch being connected in series at terminals of the resonant switch;

a transformer comprising the primary winding and a secondary winding that is electromagnetically coupled with the primary winding with opposite polarity;

a controller that controls the main switch and the resonant switch;

a rectifier smoothing circuit that rectifies and smoothes a voltage in the secondary winding; and an output voltage detector that detects an output voltage of the rectifier smoothing circuit, wherein the controller performs operations comprises:

generating a first drive signal;

controlling the main switch based on the first drive signal;

generating a second drive signal;

turning on the resonant switch during a flyback period when an energy stored in the transformer is released from the secondary winding based on the second drive signal, which causes a resonant current to flow; and turning off the resonant switch during an excitation current charging period in which the energy stored in the transformer charges the resonant capacitor after the resonant current stops flowing.

2. The semiconductor apparatus according to claim 1, wherein the controller performs operations further comprising:

generating a third drive signal; and controlling the resonant switch after the second drive signal based on the third drive signal.

3. The semiconductor apparatus according to claim 2, wherein the controller further comprises:

a zero cross detector that outputs a zero cross signal indicating that a zero voltage is detected at which the voltage in an auxiliary winding of the transformer changes from negative to positive or positive to negative voltage; and a second pulse generator that outputs a second pulse signal to turn on the resonant switch after a predetermined delay time based on the zero cross signal.

4. The semiconductor apparatus according to claim 3, wherein the controller further comprises:

an enable signal generator that generates an enable signal based on a feedback voltage detected by the output voltage detector; and a second pulse delay circuit that delays the third drive signal based on the zero cross signal and the enable signal, wherein the second pulse delay circuit delays the third drive signal so that a frequency is reduced when a load current decreases.

5. The semiconductor apparatus according to claim 3, wherein the controller further comprises;

an enable signal generator that generates an enable signal based on a feedback voltage detected by the output voltage detector; and a disable signal generator that generates a disable signal based on the second drive signal, and a second pulse delay circuit that delays the third drive signal based on the zero cross signal, the enable signal and the disable signal, wherein the second pulse delay circuit delays the third drive signal so that a frequency is reduced when a load current decreases.

6. The semiconductor apparatus according to claim 2, wherein the controller comprises:

an excitation current detector that detects an excitation current of the transformer and outputs a first voltage signal proportional to the excitation current; and an output voltage detector that outputs a second voltage signal proportional to the output voltage, wherein the controller sets a timing for turning on the second drive signal based on the first voltage signal and a threshold value set based on the second voltage signal, the controller generates the second drive signal so that an on-width of the second drive signal is at least one-half of a resonant cycle of the resonant current and a turn off timing of the second drive signal is during the excitation current charging period.

7. The semiconductor apparatus according to claim 2, wherein the controller comprises an excitation current detector that detects an excitation current of the transformer and outputs a first voltage signal proportional to the excitation current, the controller sets a turn-on timing of the second drive signal based on the first voltage signal and a third voltage signal, and generates the second drive signal so that an on-width of the second drive signal is at least one-half of a resonant cycle of the resonant current and a turn off timing of the second drive signal is during the excitation current charging period.

8. The semiconductor apparatus according to claim 1, wherein the controller comprises:

an excitation current detector that detects an excitation current of the transformer and outputs a first voltage signal proportional to the excitation current; and an output voltage detector that outputs a second voltage signal proportional to the output voltage, wherein the controller sets a timing for turning on the second drive signal based on the first voltage signal and a threshold value set based on the second voltage signal, and the controller generates the second drive signal so that an on-width of the second drive signal is at least one-half of a resonant cycle of the resonant current and a turn off timing of the second drive signal is during the excitation current charging period.

9. The semiconductor apparatus according to claim 1, wherein the controller comprises an excitation current detector that detects an excitation current of the transformer and outputs a first voltage signal proportional to the excitation current, and the controller sets a turn-on timing of the second drive signal based on the first voltage signal and a third voltage signal, and generates the second drive signal so that an on-width of the second drive signal is at least one-half of a resonant cycle of the resonant current and a turn off timing of the second drive signal is during the excitation current charging period.

* * * * *